United States Patent
Van Bilderbeek

(10) Patent No.: US 6,662,868 B1
(45) Date of Patent: Dec. 16, 2003

(54) CLAMPING WELL CASINGS

(76) Inventor: Bernard H. Van Bilderbeek, Flat 3, 5 Sloane Ct East, London, SW3 4TQ (GB)

(*) Notice: Subject to any disclaimer, the term of this patent is extended or adjusted under 35 U.S.C. 154(b) by 0 days.

(21) Appl. No.: 09/696,427

(22) Filed: Oct. 25, 2000

Related U.S. Application Data

(63) Continuation-in-part of application No. 09/563,959, filed on May 3, 2000.

(51) Int. Cl.[7] .......................... E21B 23/00; E21B 33/02; F16L 7/00
(52) U.S. Cl. ..................... 166/89.1; 166/96.1; 166/88.2; 285/123.1; 285/382
(58) Field of Search ........................ 285/123.1, 123.15, 285/382, 382.7; 166/75.14, 88.2, 88.3, 89.1, 89.3, 96.1, 217, 262.2

(56) References Cited

U.S. PATENT DOCUMENTS

| | | | | |
|---|---|---|---|---|
| 2,097,615 A | * | 11/1937 | Burns et al. | 166/88.2 |
| 4,018,462 A | * | 4/1977 | Saka | 285/111 |
| 4,585,059 A | * | 4/1986 | Lee | 165/154 |
| 4,842,082 A | * | 6/1989 | Springer | 175/279 |
| 4,911,484 A | * | 3/1990 | Hackforth | 285/382.2 |
| 4,982,795 A | * | 1/1991 | King | 166/382 |
| RE34,071 E | * | 9/1992 | Van Bilderbeek | 166/342 |
| 5,205,356 A | | 4/1993 | Bridges et al. | |
| 5,460,762 A | * | 10/1995 | Andre | 264/45.3 |
| 5,492,376 A | * | 2/1996 | Usui et al. | 285/382 |
| 5,706,894 A | * | 1/1998 | Hawkins, III | 166/208 |
| 5,735,344 A | * | 4/1998 | Duncan | 166/75.14 |
| 5,996,695 A | | 12/1999 | Koleilat et al. | |
| 6,038,933 A | * | 3/2000 | Meyer | 73/862.045 |
| 6,092,596 A | * | 7/2000 | Van Bilderbeek | 166/89.1 |

FOREIGN PATENT DOCUMENTS

EP 0251595 3/1997

* cited by examiner

*Primary Examiner*—William Neuder
*Assistant Examiner*—Jennifer Dougherty

(57) ABSTRACT

A clamp for clamping two concentric tubes, typically two concentric tubes in an oil or gas well. The clamp has two axially movable tapered components which can be pulled over one another in an axial direction to provide a contraction of internal diameter which grips the smaller diameter tube. In one embodiment, a spacer is fitted to allow the tapered components to be held apart until the tubes have been correctly positioned. The spacer is then removed, and the tapered components are drawn together to effect the clamping. A hydraulic ram can be provided to separate the tapered components should readjustment be required. In another embodiment, the larger diameter tube is made with a relatively thin wall, so that it can be distorted inwards to grip the smaller tube.

20 Claims, 20 Drawing Sheets

POS-GRIP Embodiment – Multiple Tension Riser System

CLAMPING WELL CASINGS

This is a continuation-in-part of U.S. patent application No. 09/563,959, filed on May 3, 2000.

FIELD OF THE INVENTION

This invention relates to the clamping of concentric well casings, where an inner well casing is to be clamped in position relative to an outer well casing, to achieve a desired relative axial position between the casings, for operational reasons axial fixing between coaxial well casings over a range of positions may be required at various times during drilling and/or production from wells, and the present invention makes it possible to clamp one or more casings within another at any desired position and subsequently to unclamp the casings for disassembly, or to change their relative positions and then reclamp the casings in a new relative position. As the clamping mechanism is preinstalled and can be externally activated, the blowout preventers can remain in place throughout the installation, clamping or release of the subsequently installed casing.

BACKGROUND OF THE INVENTION

In oil and gas wells, it is conventional to pass a number of concentric tubes or casings down the well. An outermost casing is fixed in the ground, and the inner casings are each supported in the wellhead or in the next outer casing by casing or tubing hangers.

These casing hangers may take the form of a body with interengaging internal shoulders on the outer casing and a body with external shoulders on the inner casing hangers, located at fixed positions on each previously installed casing.

There are however applications where a fixed position casing hanger is unsatisfactory, because the hang-off point of one casing on another may require to be adjustable.

The invention has particular application for such casing and tubing hangers, which require adjustment.

Where drilling or production wellheads have to accommodate a casing or tubing without predetermined hang-off point, it has been known to use casing slip-type support mechanisms.

It is also known from European patent number EP251595B2 to use an adjustable landing ring on a surface casing hanger to accommodate a space-out requirement.

It is furthermore known that where production wellheads have to accommodate casing or tubing with a tension load greater than the running weight, retractable shoulders or internal wedge mechanisms have been used to allow passing of the casing or tubing hanger, and re-tensioning to a predetermined point.

SUMMARY OF THE INVENTION

According to a first aspect of the present invention, there is provided a pre-installed clamping arrangement for clamping a subsequently installed tubular well casing of a first diameter within a previously installed tubular casing of larger internal diameter, the arrangement comprising a sleeve associated with the large diameter casing, the sleeve having a collar at one end which has an external tapered surface, the arrangement also including an annular component with an internal tapered surface, the sleeve and annular component being relatively axially moveable between a first position in which the tapered surface of the annular component exerts minimal or no radial force on the collar and a second position in which the tapered surface of the annular component exerts sufficient radial force to distort the collar into the bore of the larger diameter casing, to grip the well casing of smaller diameter, the arrangement also including a removable device for maintaining the surfaces in the first position, and separate means for urging the annular component axially against the collar.

The sleeve may be of one piece with the large diameter casing, but more probably will be a separate component which could either be threaded onto the casing or be located in a suitable locating and receiving area on the casing.

The clamping arrangement preferably also provides a sealing function across the interface between the tapered surfaces, either through the metal/metal contact between the tapered surfaces, or through a separate seal body. Where the sleeve is a separate component from the larger diameter casing, there may be a metal/metal seal between the tapered surfaces and, in addition, a separate seal between the sleeve and the casing.

The device for maintaining the surfaces in the first position is preferably a spacer ring. The spacer ring may be removable, or may be a ring which can be moved axially by rotating it on a thread.

The sleeve can be formed as part of a casing hanger used for supporting a casing in a well.

The annular component can be a wellhead spool, and means can be provided to move the annular component axially in a direction away from the sleeve. This means for moving can comprise a chamber between the sleeve and the annular component, and the chamber can be pressurized to urge the wellhead component away from the sleeve.

The means for urging the annular component axially against the collar can comprise radially extending bolts extending through threaded bores in the annular component and each ending in a tapered dog, and recesses around the larger diameter casing, the recesses having inclined flanks and being positioned so that when the bolts are screwed in, the dogs enter the recesses and make contact with the inclined flanks, and as the bolts are screwed further in, the annular component is drawn further towards the sleeve.

The internal bore of the larger diameter casing may have a constant internal diameter, and the sleeve can be located between the larger diameter casing and the annular component, and when the arrangement is in use, the sleeve is in abutment with the larger diameter casing.

According to a second aspect of the present invention, there is provided a pre-installed clamping arrangement for clamping a subsequently installed tubular well casing of a first diameter within a previously installed tubular casing of larger internal diameter, wherein the larger diameter casing has a wall thickness which is sufficiently thin to allow the casing wall to be distorted inwards to grip the smaller diameter casing, the arrangement also comprising a compression unit which includes a compression collar surrounding the larger diameter casing, a compression ring axially movable relative to the collar and means for producing relative axial movement between the ring and the collar, the compression ring and compression collar having oppositely directed axially tapered annular surfaces, so that relative axial movement between the collar and ring produces a reduction in the internal diameter of the unit to distort the larger diameter casing inwards to grip the smaller diameter casing.

The tubular annular walls of oil well casings have to withstand substantial pressures, and it is this requirement to withstand certain pressures which generally determines the wall thickness of the casings. In most cases, casing walls will be too thick to allow inward deflection to grip an internal component. However by making the walls thin enough to allow such deflection, it becomes possible to achieve the advantageous clamping arrangement of the invention. It will be a matter of trial and error, or of relatively straightforward calculation, to determine the appropriate casing wall thickness for any particular application. Factors which have to be taken into account are the gap between the larger and smaller diameter casings (this gap has to be bridged when the clamp is tightened), the overall diameter of the casings and the material of which they are made. It is desirable to maintain deflection of the casing wall in the elastic range, thereby allowing the casing to expand to it's original diameter once the clamping or compression force has been removed. This allows the clamping arrangement to be reversed or disengaged relatively quickly and easily without any permanent alteration to the casing. The clamping system can, of course, plastically deflect the casing should such be required by a particular application. One such application would be clamping more than one inner casing. In such a case, it is likely that the outer casing would be plastically deformed because of the greater clamping force required to adequately grip the most inner casing.

The casing may be divided axially into different sections, and it can then be appropriate to make the section of the casing which is to be distorted inwards out of a high value/high strength material, in order to assist that section in withstanding high internal pressures and the effects of corrosion.

If it is not possible to achieve the necessary pressure resistance whilst allowing the necessary distortion for clamping to take place, then the thin walled tube may be externally reinforced to enable it to resist the hoop stresses arising when there is a high internal pressure.

The reinforcements may take the form of annular bands around the casing section, and these bands can provide the necessary thickness of material to allow a valve or valves to be fitted to the casing in the area where the casing wall is relatively thin.

The casing section where the compression unit is located may be readily separated from the rest of the casing, so that it can be replaced when necessary.

The compression unit preferably has a compression ring which is in contact with the outer surface of the large diameter casing and a compression collar which surrounds the ring and is axially movable relative to the ring. The ring may be split at one or more points around its circumference to assist assembly, and reduce radial stiffness.

The ring and the collar may each have one tapered annular surface. Alternatively, and preferably, the ring has two tapered surfaces, tapering in opposite axial directions, and the collar is split into two sections with opposite axial tapers and the means for producing the relative movement acts between the two sections of the collar to move the sections in opposite directions over the ring.

Preferably the ring has its region of greatest diameter between its two ends, and the two collar sections are drawn towards one another, for example by bolts through both sections, to compress the ring and thus to clamp the larger diameter casing onto the smaller diameter casing. Although a preferred method of drawing the two sections together is by use of a bolt, it should be understood that any suitable mechanism may be used bring the two sections together.

In addition to mechanical actuators, any suitable actuator may be used to create sufficient deflection in the outer casing. For instance, hydraulic pressure exerted on the exterior of the outer casing could be used or thermal energy could be used to create expansion and/or contraction of the outer casing thereby manipulating it's internal diameter.

The clamping arrangement described here can be used, as described, to clamp a plain walled tube. In some circumstances however (particularly for small diameter casings) it may be expedient to provide a small hanger shoulder to take a part of the casing load and/or to locate the tubular casings in a desired axial position before applying a clamping arrangement as described here to clamp the casings in position.

According to a third aspect of the invention, there is provided a pre-installed clamping arrangement for clamping a subsequently installed tubular casing of a first diameter within a previously installed tubular casing of larger internal diameter, the arrangement comprising first and second compression rings having oppositely tapered external surfaces, an annular compression actuator having an internal tapered surface surrounding the first compression ring and an external tapered surface radially outside its internal tapered surface, and an annular component having two tapered surfaces, one of said surfaces mating with the second compression ring, and the other of said surfaces mating with the external tapered surface of the compression actuator, and means for moving the annular component axially relative to the compression rings and the compression actuator between a first position in which the tapered surfaces of the annular component exert no radial force on the compression rings or the compression actuator and a second position in which the tapered surfaces of the annular component exert sufficient radial force to distort the compression rings into the bore of the larger diameter casing, to grip the casing of smaller diameter.

BRIEF DESCRIPTION OF THE DRAWINGS

The invention will now be further described, by way of example, with reference to the accompanying drawings, in which.

DESCRIPTION OF PREFERRED EMBODIMENTS

Figure 1:
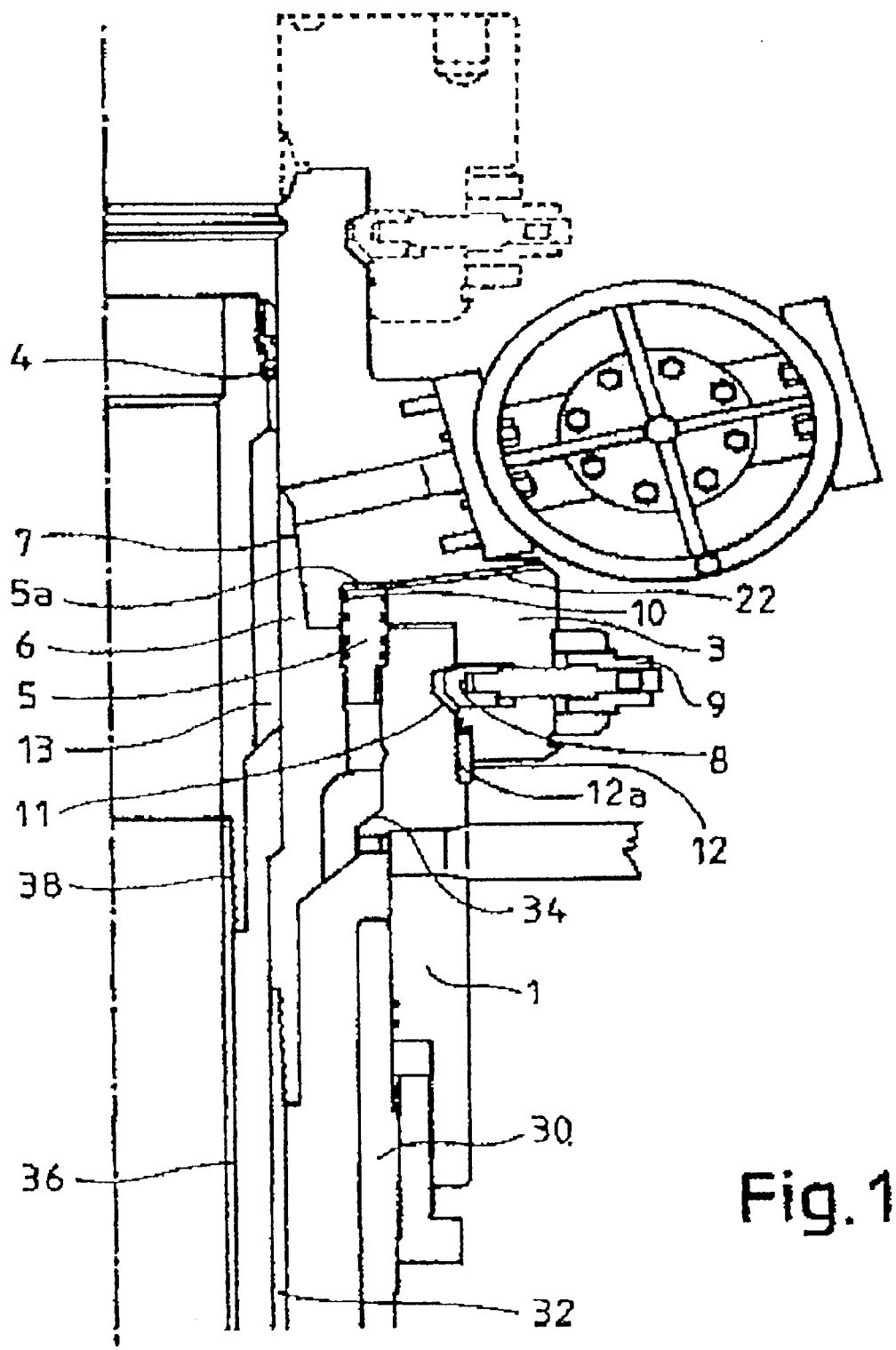
FIG. 1 shows a cross section through a surface wellhead arrangement incorporating a first embodiment of a clamping arrangement in accordance with the present invention.

The adjustable wellhead shown in FIG. 1 has a surface casing starting head 1 mounted on a casing section 30. An intermediate casing 32 is located in the casing 30 and has a casing hanger 2 by means of which the casing is landed on a shoulder 34. The hanger 2 has an extended upper neck 6 which has a tapered external profile.

A wellhead spool 3 is shown above the casing hanger 2. The wellhead spool has a tapered internal profile 7 which mates with the tapered external profile of the neck 6 and, in the position shown in FIG. 1, the spool is supported above the hanger 2 on a spacer ring 12. An annular seal ring 5 fitted with O-rings 10 provides a seal between the spool 3, the starting head 1 and the casing hanger 2.

A chamber 5a is present above the seal ring 5. This chamber can be pressurized, through a passage 22, to raise the spool 3 above the starting head 1, and such raising action will have the effect of unloading the weight of the wellhead spool 3 from the spacer ring 12.

The spacer ring 12 is axially movable (possibly removable) and is fitted between the starter head 1 and the spool 3, and, when present, this spacer ring controls the extent to which the spool 3 can be lowered onto the starter head 1. In one position of the spacer ring, it prevents any effective contact between the tapered surfaces 6 and 7. In another position, it does not obstruct engagement of the tapered surfaces.

The ring can be moved axially by rotating it on a thread 12a so that it moves up and down along the string, on the thread. Alternatively, the ring can be simply removed to remove any obstruction to engagement of the surfaces 6 and 7.

Bolts 9 (only one of which can be seen in FIG. 1), which each end in a tapered dog 8 which enters a tapered annular recess 11, allow the spool 3 to be drawn down onto the starter head 1. By screwing in the bolts, the dogs 8 bear against the tapered side wall of the recess 11 and the spool is pulled down by the camming action of the dogs. In practice, the spool will be drawn down by tightening each bolt around the string circumference, by a specified tightening extent, in turn. Working around the string circumference in this way will gradually pull the tapered surfaces 6 and 7 against one another to effect a clamping action.

A production casing 36 is run into the well on an adjustable surface casing hanger 4. The casing 36 is threadedly engaged at 38 with the hanger 4. The casing is slotted at 13 for flow-by, and the hanger is positioned so that part of its length is surrounded by the extended upper neck 6 of the casing hanger 2.

During running of the casing 36, the internal diameter of the neck 6 is such that the casing hanger 4 can move axially past the neck. At this stage, the spacer ring 12 is in its first position where it prevents engagement between the surfaces 6 and 7, the extended upper neck 6 is unstressed and so the casing hanger 4 is able to move freely past the neck 6.

However when the casing hanger 4 has reached a position within the intermediate casing hanger at which it is to be clamped, the annular chamber 5a is pressurized to lift the wellhead 3 and to allow the spacer ring 12 to be lowered or removed. Once this has happened, the annular seal 5 is relieved of pressure and both gravity and tightening of the tapered bolts 9, results in the wellhead 3 being lowered onto the casing hanger 2 so that the tapered surfaces 6, 7 come into contact with one another. On further tightening of the bolts 9, the wedging effect of the surfaces 6 and 7 results in the extended upper neck 6 being distorted into the path of the production casing hanger 4, to a position where it grips the casing hanger which therefore becomes clamped in the well at that point.

If the position in the well of the production casing then has to be altered, for example after tensioning the production casing, then this can be done by releasing the bolts 9 and then pressurizing the seal ring 5 to raise the wellhead. This relieves the wedging force acting on and distorting the extended upper neck. The neck then returns to its unstressed position where the casing hanger 4 can move freely axially past the neck.

When the casing components have taken up their new positions, for example after tensioning the production casing, then they can be clamped relative to one another by once again lowering the wellhead using the procedure described above to activate the clamp.

The bolts 9 with their clamping dogs 8 must be retracted before the wellhead can be fully lifted, and have to be fully inserted in order to apply maximum clamping force to the casing hanger 4.

Figure 2:
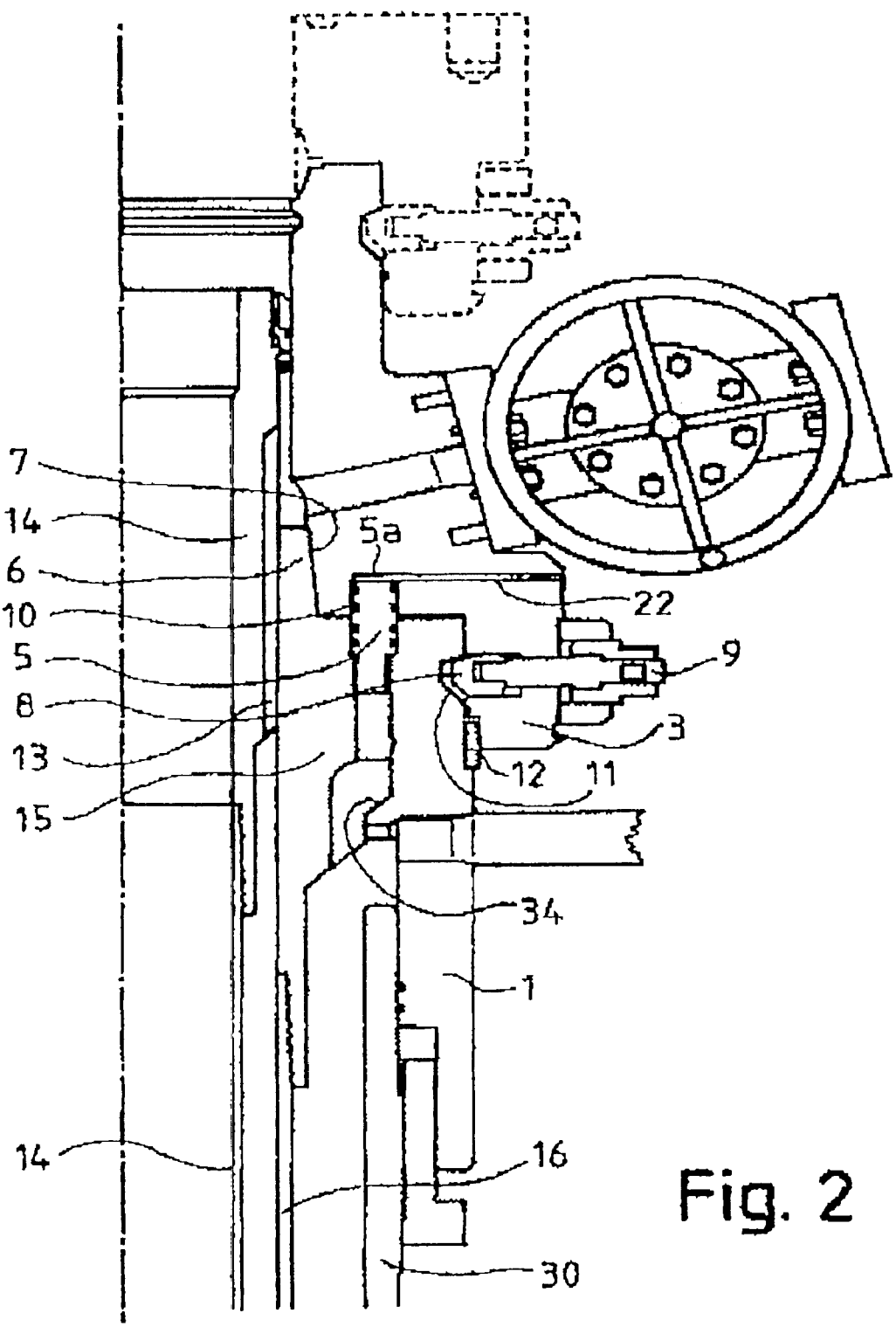
FIG. 2 shows a second embodiment of a clamping arrangement.

FIG. 2 shows a second embodiment which is largely similar to the embodiment of FIG. 1 except that the internal bore represented by the intermediate casing 16 and its casing hangar 15 now has a uniform internal diameter, so that the production casing hangar 14 can pass completely through the intermediate casing 16 and its hangar 15 when the clamp is not operated.

However, the production casing hangar 14 can be gripped and clamped in the intermediate casing 15, by a mechanism the same as that shown in FIG. 1, and corresponding parts in FIG. 2 carry the same reference numerals as they carry in FIG. 1.

Figure 3:
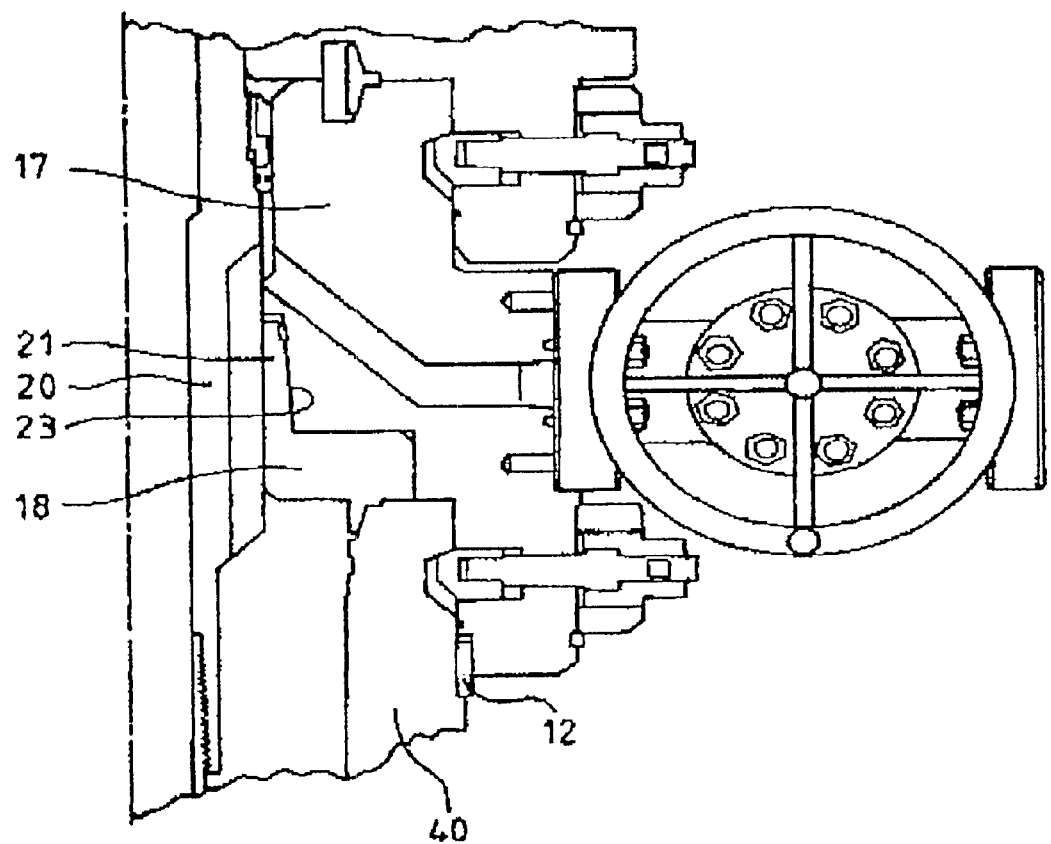
FIG. 3 shows a detail, on a larger scale, a third embodiment of a clamping arrangement

FIG. 3 shows a wellhead housing 40 with a tubing head 17 installed above it. An extended upper neck 21 is formed on an annular component 18 which has an internal diameter just slightly greater than the external diameter of the tubing hanger 20. The tubing head has a tapered surface 23 which mates with the neck 21.

As described in relation to FIGS. 1 and 2, the surface of the neck 21 and the surface 23 of the tubing head 17 mate to form, when the tubing head is lowered onto the component 18, a clamp which clamps the tubing hanger 20 relative to the wellhead housing 40.

Figure 4:
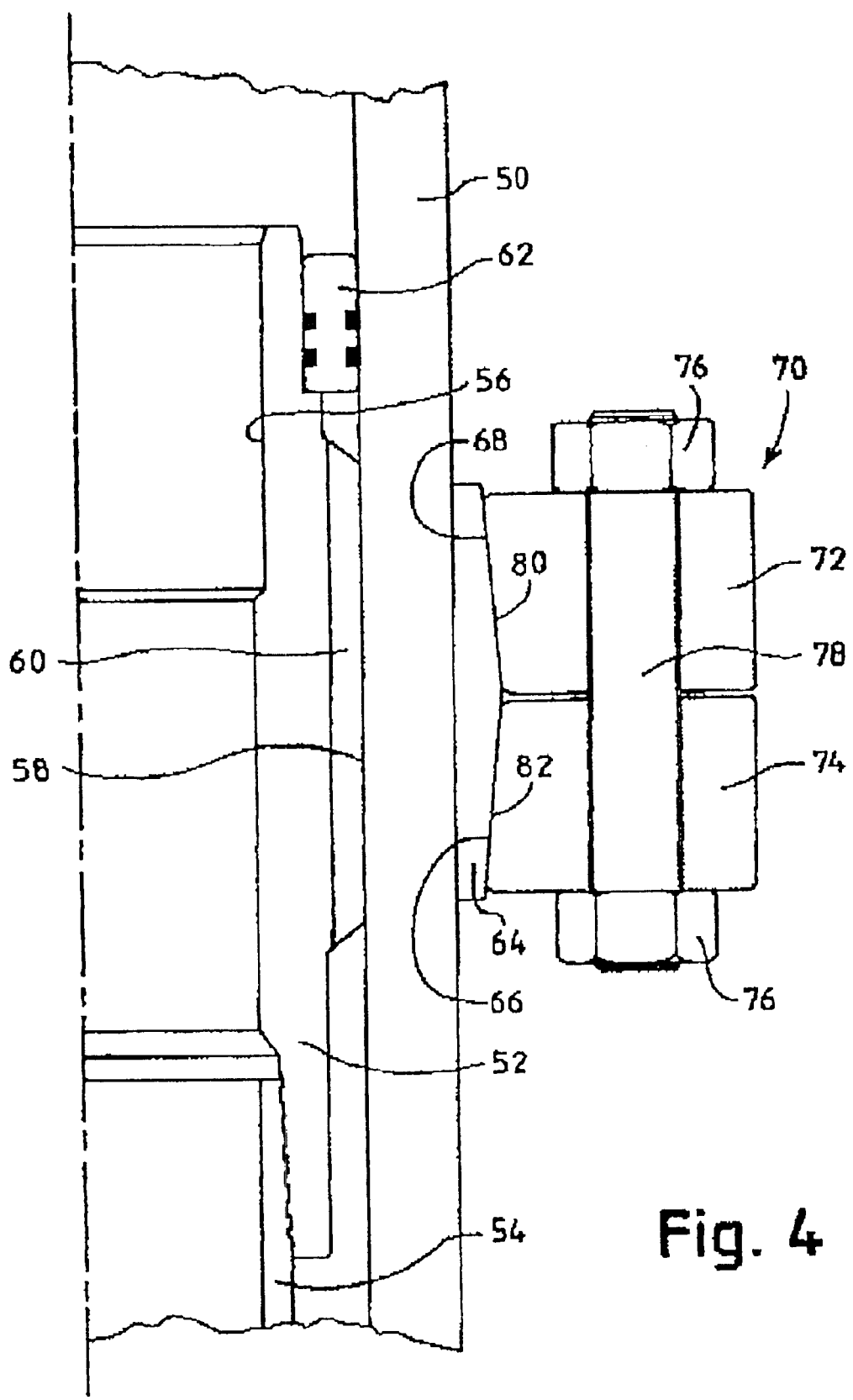
FIG. 4 shows, on a larger scale, a cross-section through a fourth embodiment of a clamping arrangement.

FIG. 4 shows a well casing tube 50 within which a casing hanger 52 is positioned. The casing hanger 52 is a close fit within the internal wall of the tube 50, and a casing 54 is suspended from the lower end of the hanger 52. At the top of the hanger 52 is a socket 56 which can be used to connect a running tool to the hanger. The outer surface of the hanger, at 58, is relieved by a flow-by passage 60, and this passage is, when necessary, closed by an annular seal 62.

On the outside surface of the casing or wellhead housing 50, and alongside the position of the casing hanger 52, a compression ring 64 is fitted. This compression ring extends right the way around the casing 50, but may be split at one point around its circumference to allow it to be compressed and reduced in diameter. The ring 64 has two oppositely directed tapered surfaces 66, 68, and the point of greatest diameter of the ring is midway between its ends.

A compression collar 70 is made up of two collar sections 72 and 74 which can be drawn towards one another by tightening one or both of nuts 76 at opposite ends of the bolt 78. The collar sections 72 and 74 (which are each annular) have inwardly directed tapered faces 80 and 82 which match the tapered faces 66, 68 on the ring 64.

When the nuts 76 are tightened, the sections 72, 74 are drawn towards one another and they ride up the ramps 66, 68 with the result that the ring 64 is squeezed and reduced in diameter. This reduction in diameter is transmitted to the part of the casing 50 immediately within the ring 64, and the casing 50 will be compressed inwards to squeeze the casing against the outer surface 58 of the hanger 52.

It will be appreciated that there will be bolts 78 with nuts 76 arranged at regular intervals around the circumference of the compression unit 70, and to tighten the compression unit to produce clamping, it will be necessary that the bolts be tightened sequentially around the circumference until the correct clamping force has been achieved.

It will be clear that the clamping can only be effective if there is sufficient deformability within the casing tube 50. To achieve this deformation, it is likely that the tube 50 will have to be thinner than it would otherwise be. It is not however anticipated that a skilled man would find it difficult to design a tube which would have the necessary deformability for a particular application of this invention.

Instead of bolts 78 and nuts 76, it may be possible to use an alternative mechanism which draws the two collar sections 72, 74 together.

Figure 5:
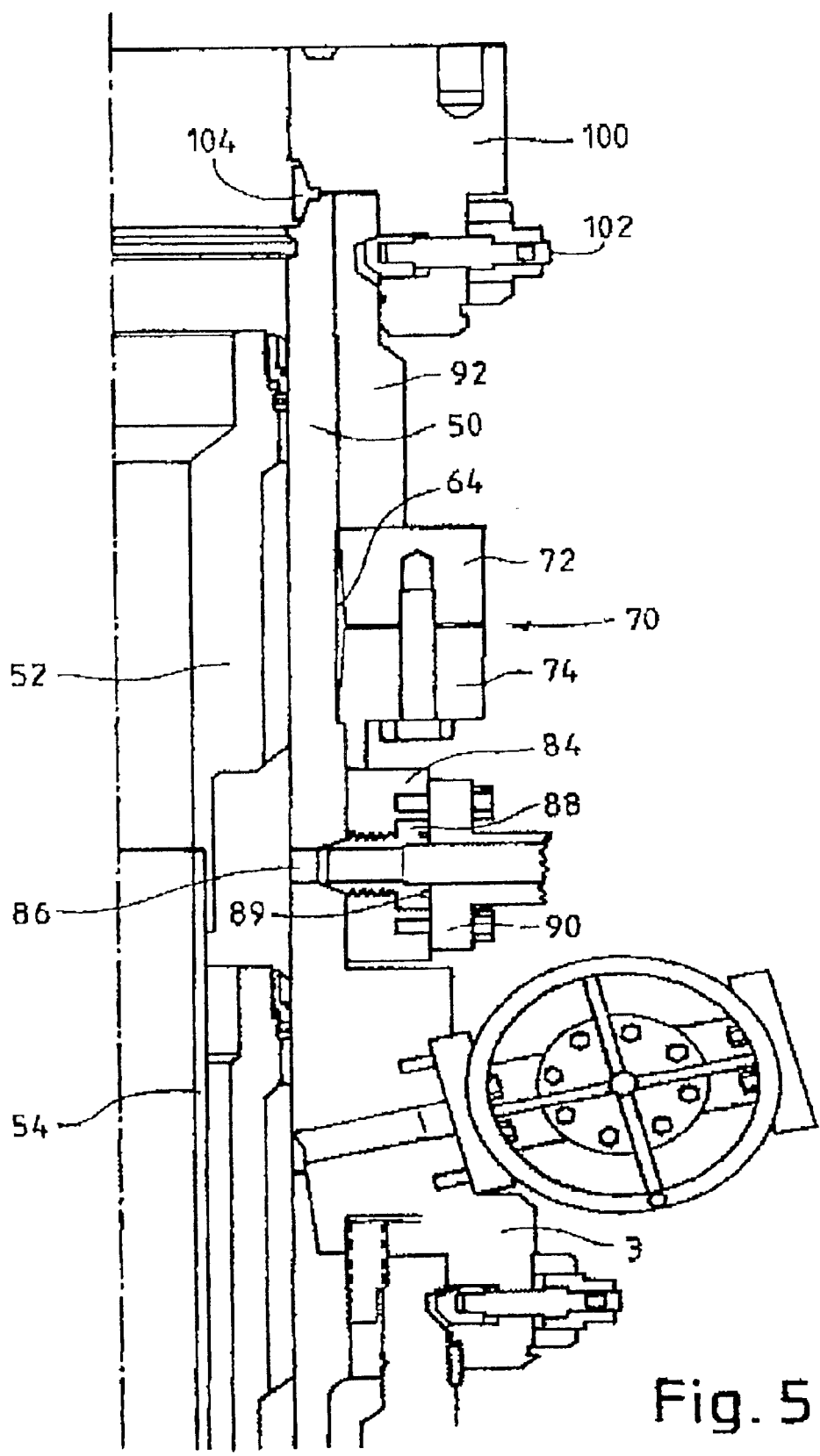
FIGS. 5 and 6 show two alternative arrangements incorporating the clamping arrangement of FIG. 4.

FIG. 5 shows the arrangement of FIG. 4, but on a smaller scale with other ancillary components also being in view.

Because the casing tube 50 is thinner than it would be expected to be (in the absence of the clamping arrangement described here) other devices are fitted around the tube, to strengthen the tube and to assist the tube in resisting hoop stresses caused by high internal pressures.

Below the pressure unit 70, there is a reinforcing ring 84 which is put in place by sliding it over the top of the casing 50. The ring 84 is annular in form to support the whole of the circumference of the tube 50.

At one or several points around the circumference of the casing tube 50 there is an outlet port 86, and the reinforcement ring 84 has a corresponding passage in which a threaded insert 88 is fitted. A valve flange 90 then is bolted onto the reinforcement ring 84. The threaded insert 88 is made up into the mouth of the opening 86, to form a metal-to-metal seal. On the side of the valve flange, the threaded insert 88 is fitted with an annular groove 89 into which a seal ring is fitted to effect a seal between the flange and the valve body.

The flange 90 will be the flange plate of a conventional valve (the valve itself is not shown here), so that when the assembly is completed, the valve can be opened or closed to open or close communication between the interior of the casing and the exterior through the passage 86.

Above the compression unit 70, there is an upper collar 92 which will be slid onto or threaded onto the external surface of the tube 50, to provide reinforcement in this upper area.

It will be seen in FIG. 5 that the casing tube 50 is part of one piece of material with the wellhead spool 3. However in FIG. 6, where the same parts carry the same reference numerals, the tube 50 is a separate component from the wellhead spool 3, with the two components being sealed to one another along a thread line 96, with the interposition of O-ring seals 98. This construction makes it possible to manufacture the deformable tube 50 from a material different from the spool 3. It also makes it possible to replace the tube part 50 independently of the spool 3. The material and manufacturing of each of these parts can therefore be optimized for the particular function and an internally damaged wellhead can be refurbished by exchanging the tube 50 only.

Figure 6:
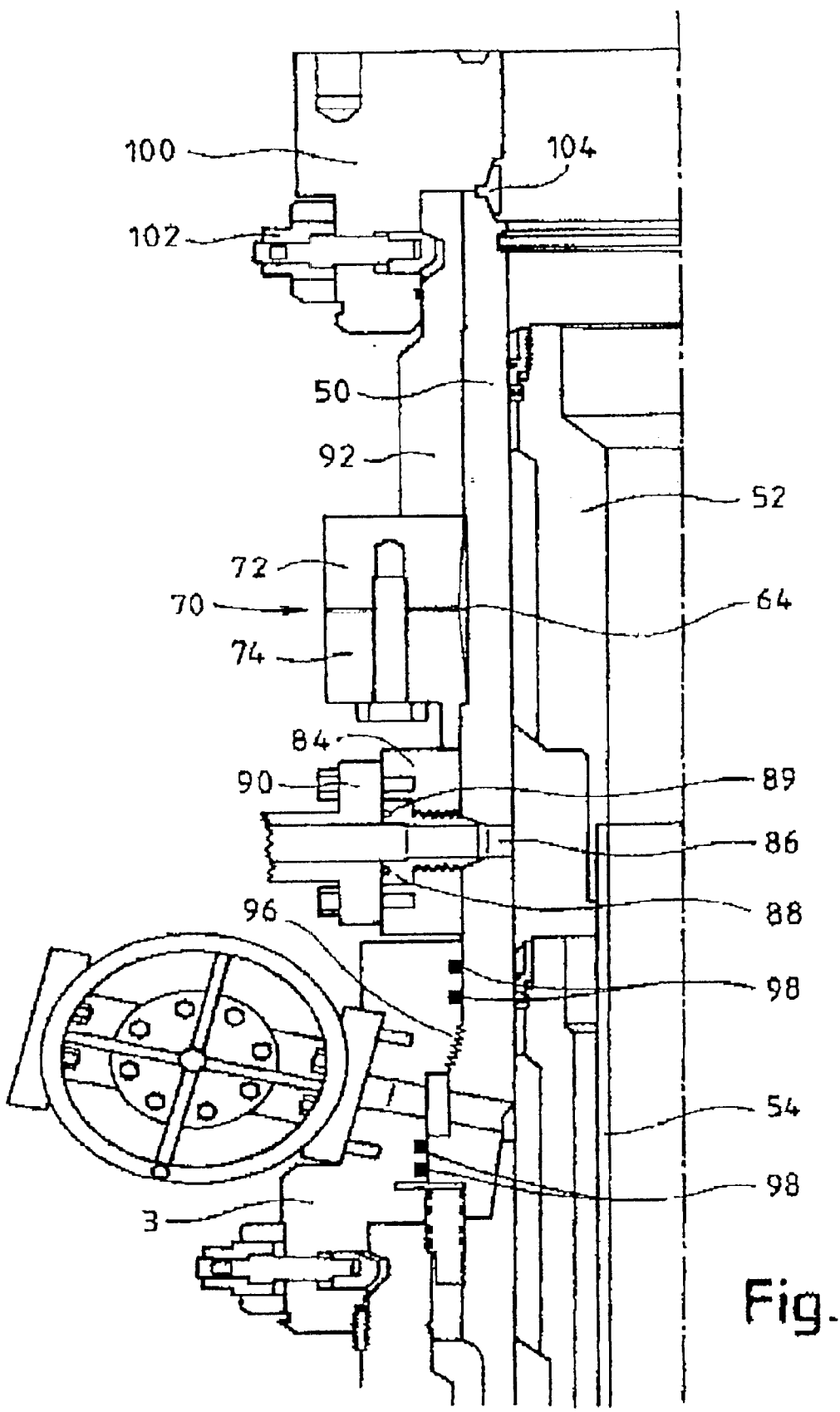

FIGS. 5 and 6 also show a drilling riser connector 100 to which a drilling riser can be connected. The connector 100 is fitted to the reinforcing ring 92 and is secured on the ring by means of axially directed dogs 102, in a manner which is in itself known. A metal sealing ring 104 provides the necessary seal.

Figure 20:
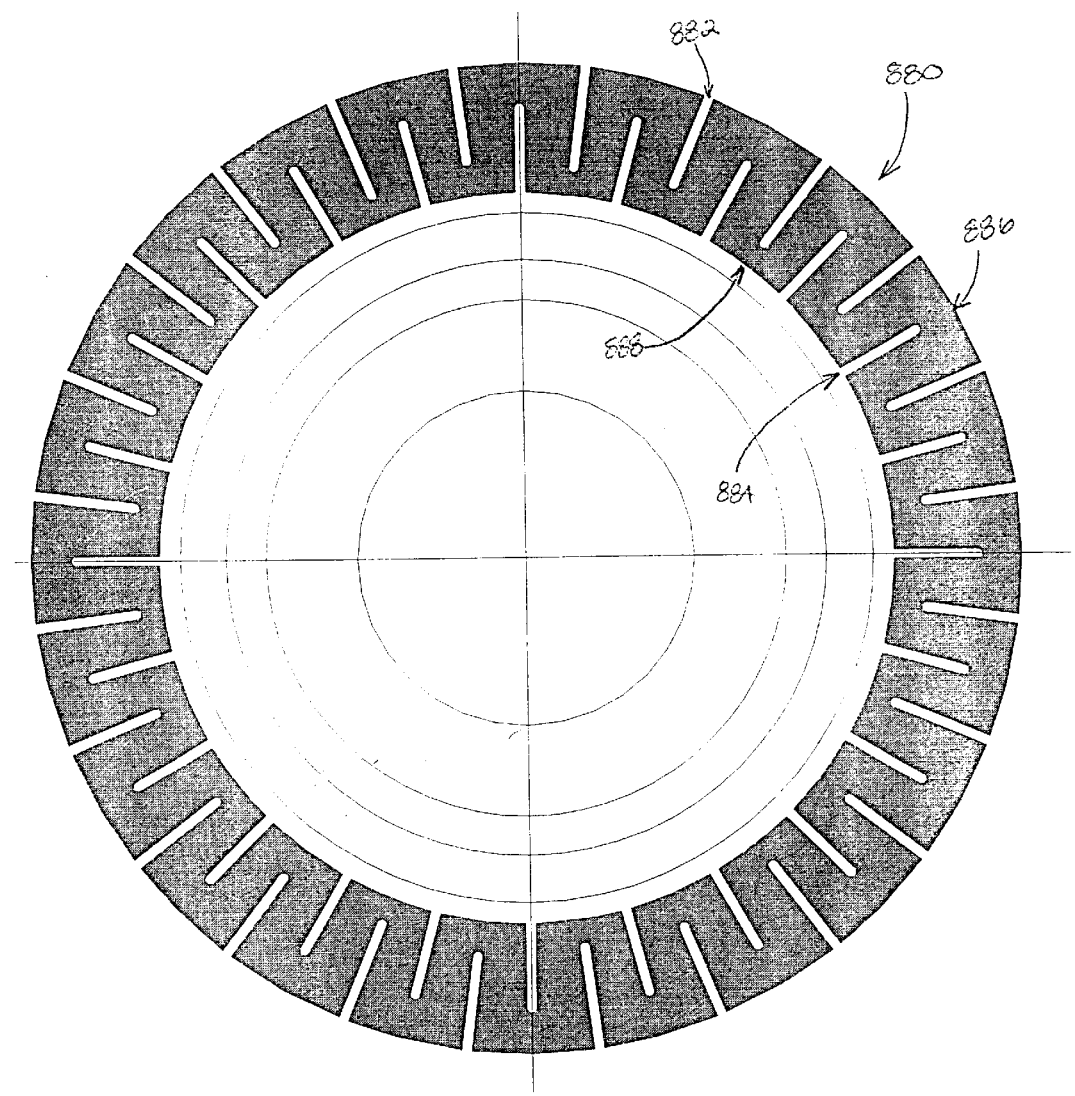
FIG. 20 shows a cross sectional view of a slotted casing which may be used in the invention.

In order to effect the clamping more easily, tube 50 can be relatively thin, and can be economically made of a high value material. It may need to be a material particularly resistant to corrosion, and of course it has to be capable of the distortion necessary to achieve clamping. However because the tube is backed up around most, if not all, of its external circumference it does not need great mechanical strength. The mechanical strength can be provided by the surrounding components. In some cases, it may be necessary to provide a clamping force that will deform the casing tube 50 beyond it's elastic limit. For instance, where more than one inner casing must be clamped or gripped, the force required to clamp the innermost casing may likely cause plastic deflection of the outermost casing. In certain instances, it may be desirable to provide an outer casing that has more flexibility. FIG. 20 shows such a casing. The slotted casing 880 has a plurality of outer or exterior slot 882 located at intervals along it's outer surface 886. Similarly, the slotted casing 880 also may have a plurality of inner or interior slots 884 formed at intervals along it's inner surface 888. These plurality of slots 882, 884 allow the casing 880 to flex or compress to a greater degree than non-slotted casing within the elastic range or for a given activation force. The slots also help to alleviate hoop stresses which may occur during compression of the casing. In a preferred embodiment, the slots are approximately 0.25 inches in width and are positioned every 7.5 degrees around the interior surface 888 and/or exterior surface 886 of the casing 880.

One particular advantage of the embodiment shown in FIGS. 4–6 is that there is no discontinuity in the wall of the casing, and therefore no potential leak path for the leakage of pressure.

It is thus possible to close off an annulus in an oil or gas well, with the closure and the seal being arranged at any convenient position along the length of the casing string.

Figure 7:
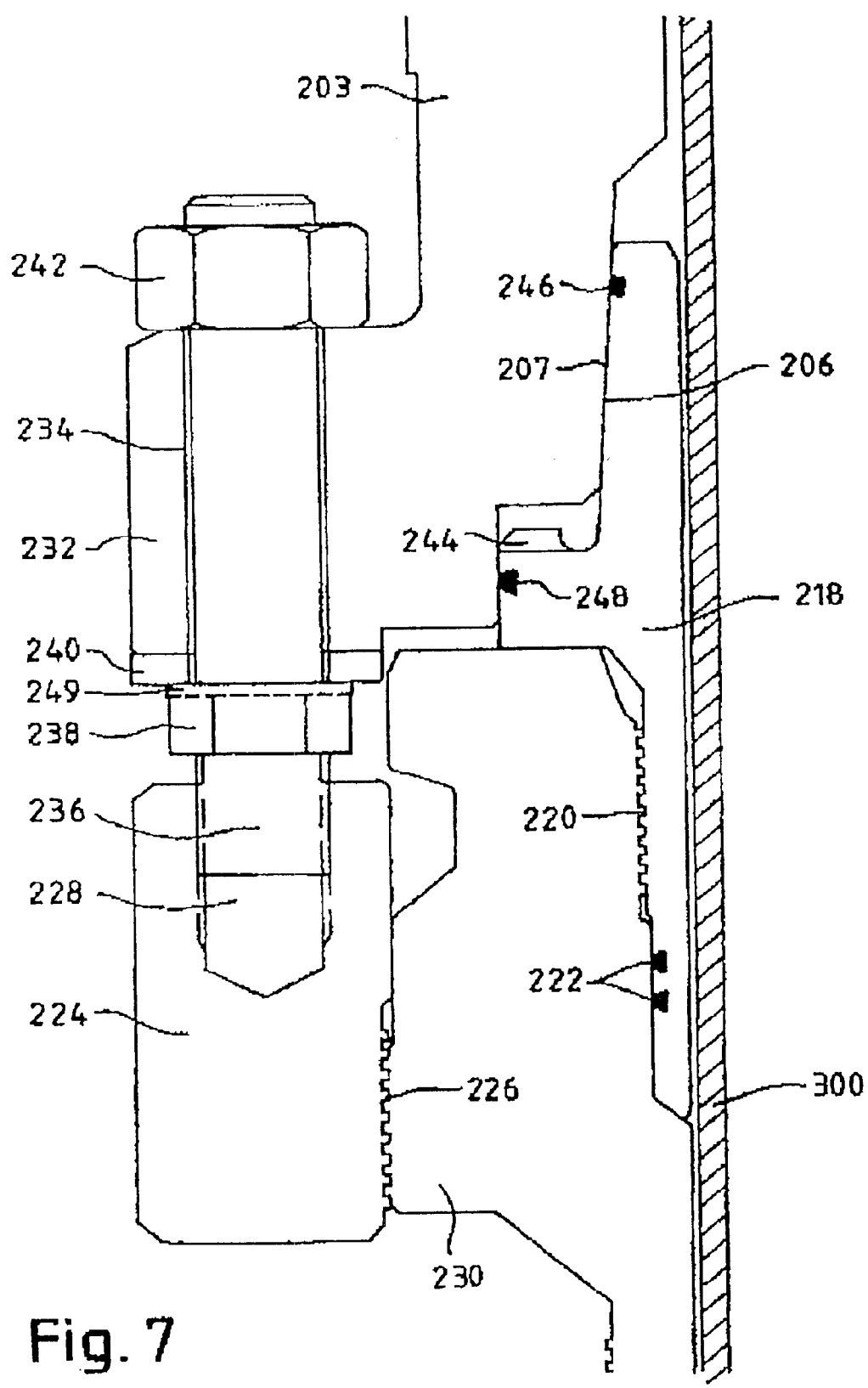
FIG. 7 shows a fifth embodiment of a clamping arrangement.

FIG. 7 shows two adjacent casing sections 203 and 230. The upper casing section 203 has a tapered internal profile 207 which mates with a tapered external profile 206 of a clamp component 218. The component 218 is threaded to the lower casing section 230 at 220, and seals 222 provide the necessary sealing function.

Around the exterior of the casing section 230, an anchoring ring 224 is fitted, the ring being connected to, and adjustable relative to, the casing section on a thread 226. The ring 224 has a series of threaded bores 228 arranged around the circumference. Only one of these bores is visible in the figure.

The upper casing section 203 has a shoulder 232 which has a series of through bores 234 each of which registers with one of the threaded blind bores 228 in the ring 224. Threaded studs 236 are fitted in each of the bores.

Each stud 236 has a lower end which screws into one of the blind bores 228. A nut 238 is threaded onto the stud, and a thrust plate 240 with a washer 249 lies above the nut. The upper casing section 203 is then placed over the upstanding part of the stud, and a further nut 242 is threaded onto the top of the stud.

In use, the nuts 242 can be tightened to draw the casing section 203 and its tapered surface 207 down onto the tapered surface 206 of the clamp component 218, to clamp a tube 300. It will be seen from FIG. 7 that the positions of the nuts 238 determine the extent to which the tapered surface 207 of the casing section 203 can be drawn down onto the tapered section 206 of the clamp component 218, and thus determines the clamping force which can be applied to the tube 300. However the positions of the nuts 238 relative to the lower casing section 230 can be altered by turning the nuts on the threads of the studs 236.

The nuts 238 can also be used to release the clamp. To do this, the upper nuts 242 are slackened off, and a tool is used to turn the nuts 238 so that they lift the upper casing section 203 to reduce the engagement between the surfaces 206 and 207. The presence of the thrust plate 240 and washers 249 makes it possible to turn the nuts 238 when they are under load.

FIG. 7 also shows a fixed end stop 244, which provides the ultimate limit to relative axial movement between the tapered surfaces, and annular seals 246 and 248 between the separate clamp component 218 and the upper casing section 203.

Figure 8:
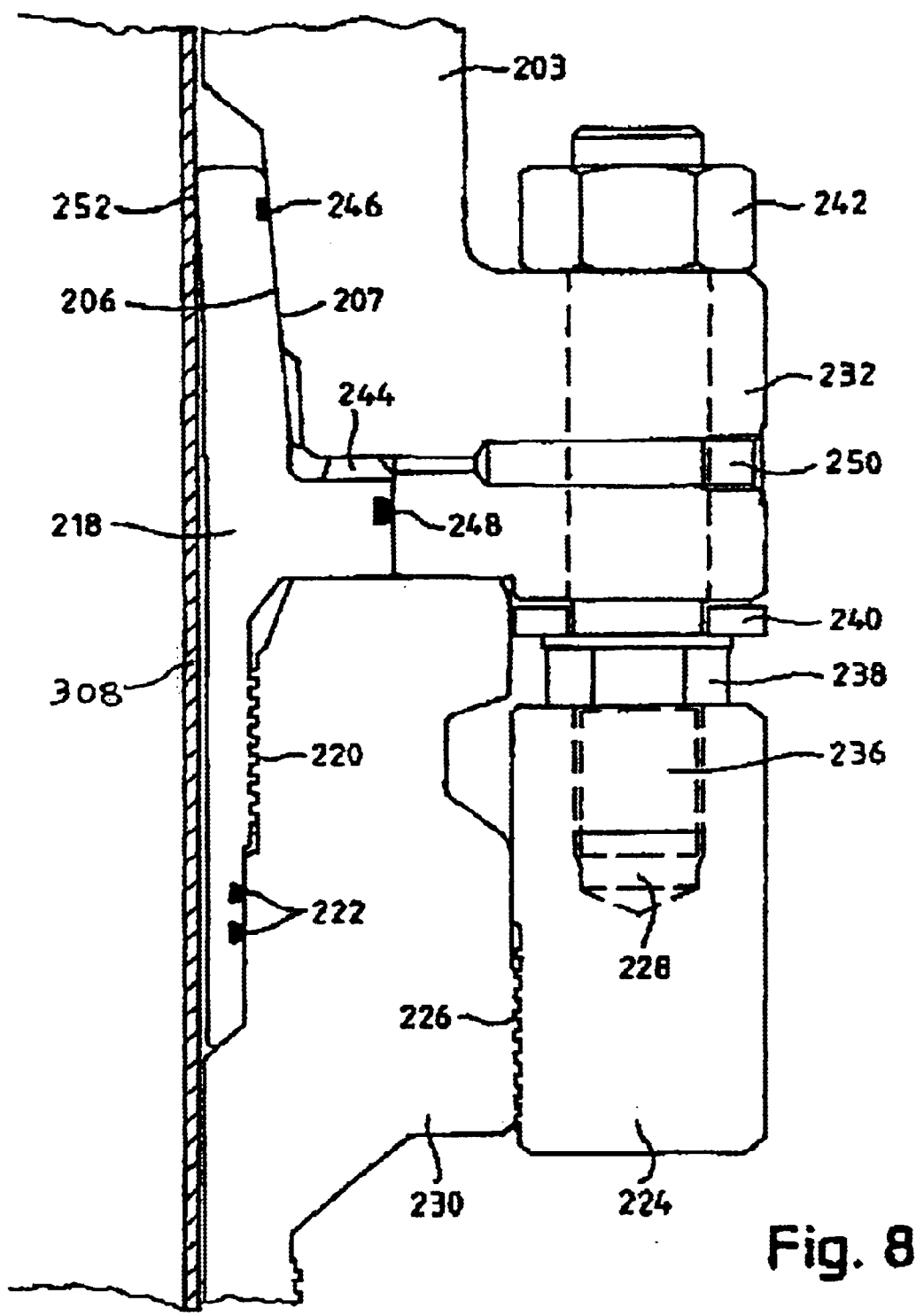
FIG. 8 shows a sixth embodiment of a clamping arrangement.

FIG. 8 shows the arrangement of FIG. 7, but with the clamp fully tightened up to the stop 244. It will be seen that there is clamping contact between the component 218 and the casing 300 at 252. The view shown in FIG. 8 is taken at a different point around the casing circumference, and shows a monitoring port 250 which communicates with the gap between the clamp component 218 and the uppercasing section 203.

Figure 9:
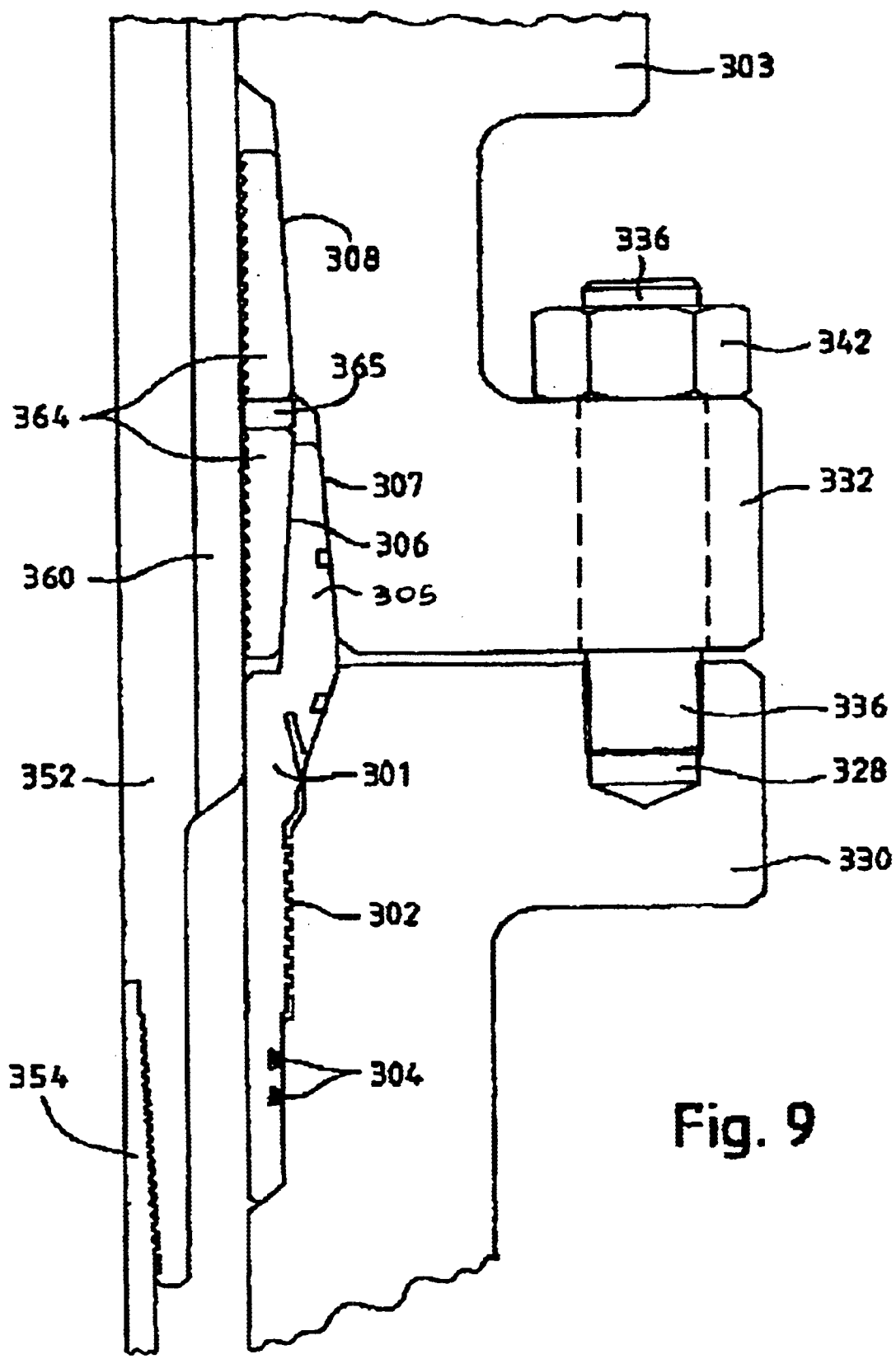
FIG. 9 shows a seventh embodiment of a clamping arrangement.

FIG. 9 shows an embodiment which combines features from earlier described embodiments.

In FIG. 9, a casing hanger 352 is to be clamped within an upper casing section 303 and a lower casing section 330. The hanger 352 has a flow-by passage 360, and has a casing 354 threaded to its lower end.

Two compression rings 364 (each similar to one half of the ring 64 of FIG. 4) separated by a plain ring 365 are retained within a correspondingly shaped annular, internal recess formed by the upper and lower section 303, 330. Also within this recess is an annular sleeve 301. The sleeve 301 is threaded at 302 onto a corresponding internal thread on the section 330. Seals 304 are provided to seal between the sleeve and the section 330.

The sleeve 301 has an upper region 305 which has both an internally tapered surface 306 and an externally tapered surface. The upper section 303 has an upper internally tapered surface 308 and a lower internally tapered surface 307.

When the components are assembled as shown in FIG. 9, tightening of the nuts 342 (of which there will be several around the circumference) draws the upper section 303 towards the lower section 330. This will cause all the tapering surfaces to ride over one another.

The surface 308 of the upper section 303 will ride over the upper compression ring 364 and will compress the ring inwardly.

The surface 307 of the upper section 303 will ride over the upper part of the sleeve 301 and will compress the sleeve inwardly.

At the same time, the upper part of the sleeve 301 will be driven into the tapering gap between the lower one of the compression rings 364 and the upper section 303, and this will cause the lower compression ring to be compressed radially inwards, to grip the casing hanger 352, at whatever part of the hanger lies within the circumference of the rings 364.

In this embodiment, metal/metal seals exist between the surfaces of the upper and lower sections, the compression rings 364 and the sleeve 301. The surfaces of the compression rings which will make contact with the hanger 352 can be ribbed or serrated, in order to enhance the grip of the rings on the hanger. The compression ring could be made from a single component with two oppositely tapered surfaces, instead of the construction described above.

The clamping/clamping system described here is easy and simple to operate and allows the parts of the clamp to be held apart, against gravitational influences, until the components to be clamped are in their correct relative positions. It also allows the clamp to be easily opened and closed to allow adjustment of relative axial positions.

As previously described, the clamping arrangement of the present invention uses mechanical force to create a gripping force on the pipe. Specifically, a plurality of nuts are typically tightened to draw a corresponding pair of tapers together thereby causing deflection of the outer casing and subsequent gripping of the inner casing. It should be understood that any mechanism or method may be used to cause deflection of the outer casing sufficient to create a gripping or clamping force to be exerted on the inner casing.

Figure 10:
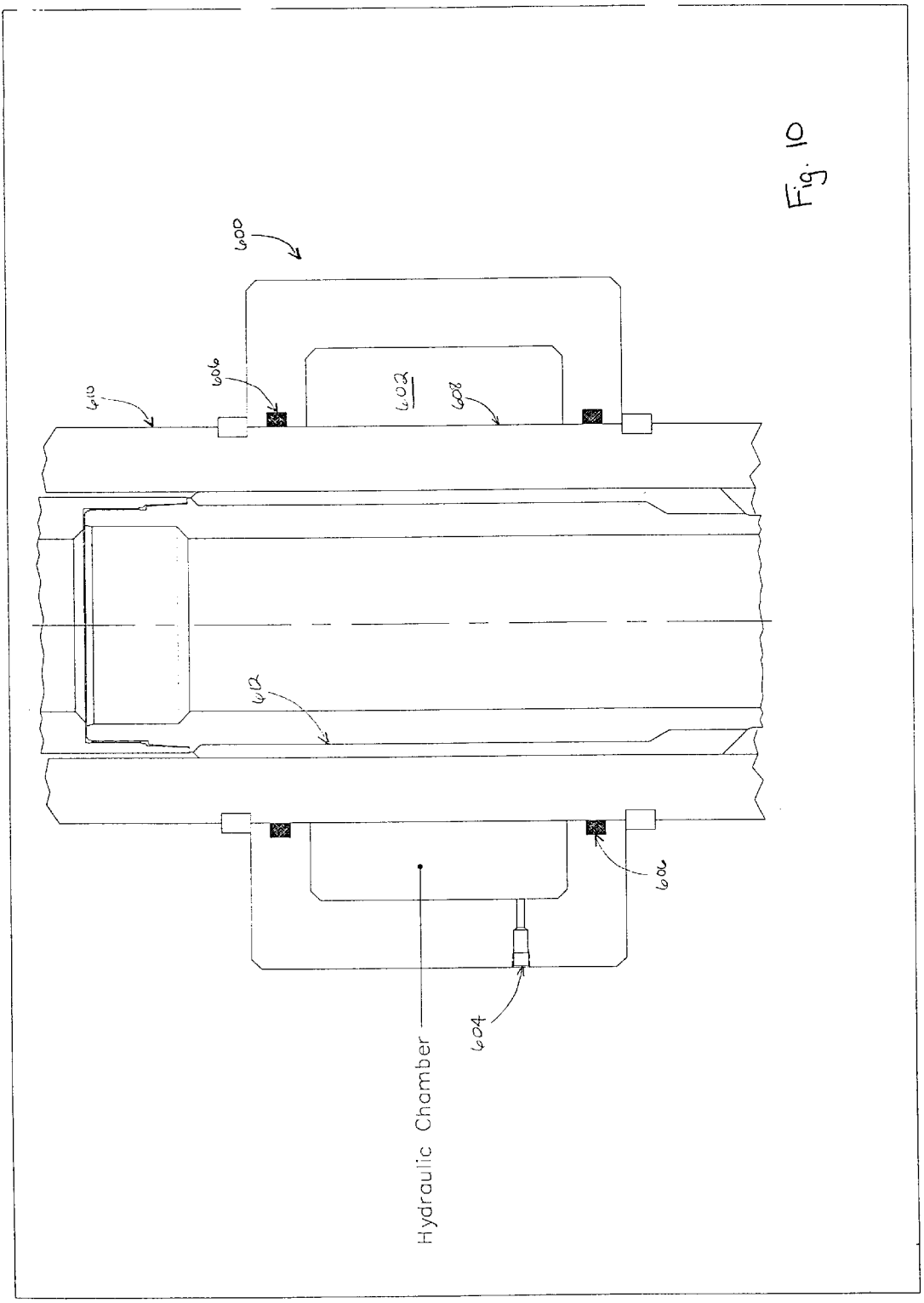
FIG. 10 shows a hydraulically actuated clamping arrangement.

In one embodiment, a hydraulic force may be used to create a clamping force. FIG. 10, shows a preferred hydraulic clamping arrangement 600. The hydraulic clamping arrangement 600 includes a hydraulic chamber 602, inlet port 604 and seals 606. The chamber 602 is configured such that one side 608 of the chamber is formed by the outer casing 610. The remaining sides of the chamber are formed such that the chamber forms a continuous loop or circle around the riser. A hydraulic fluid may be introduced into the chamber through port 604. The seals 606 prevent escape or leakage of the fluid once it has been introduced into the chamber and thereby maintain pressure within the chamber. As the pressure in the chamber is increased, either by introduction of an increased volume of fluid or through expansion of a substance present in the chamber, the side 608 is deflected to create a gripping or clamping force between it and the inner casing or hanger 612. By selection of the hydraulic fluid and use of monitoring equipment, such as pressure gauges, strain gauges and the like, the specific force exerted by the fluid on the outer casing 610 may be precisely controlled to create a specific amount or degree of deflection. Any suitable fluid may be used, however, concrete, plastic, or a similar fluid is preferable because it can be supplied at a relatively low pressure into the chamber, at which point it may expand to create a hydraulic force to cause deflection of the outer casing. Additionally, concrete hardens over time, thereby maintain pressure in the chamber without reliance on the seals, which otherwise would require replacement over time.

Figure 11:
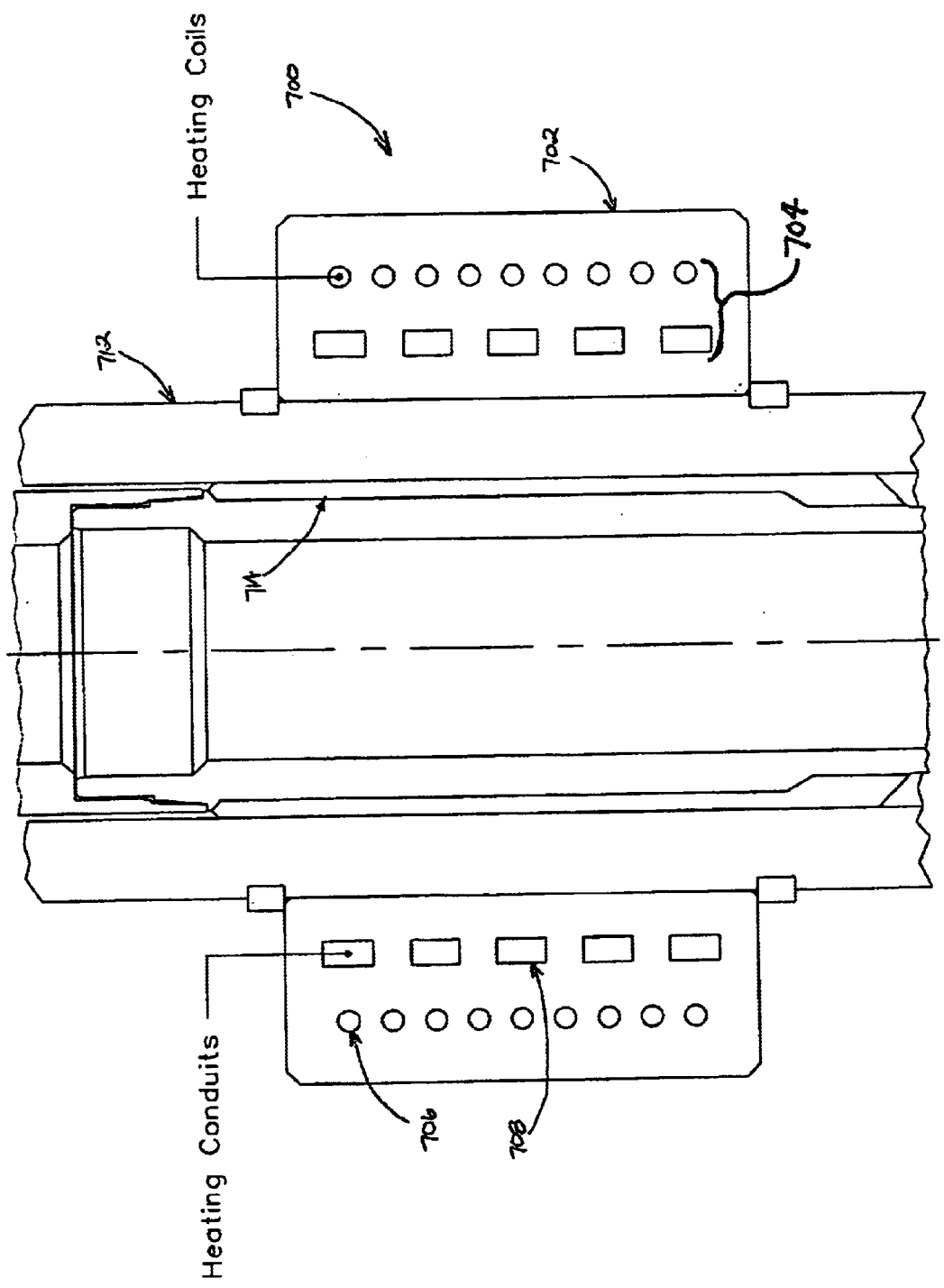
FIG. 11 shows a thermally actuated clamping arrangement.

In another embodiment and as shown in FIG. 11, the force required for clamping or gripping may be formed through the use of thermal expansion and/or contraction. A heating system 700 may incorporate a heating unit or body 702 which may contain any number of heating elements 704. The heating elements may be of any suitable type, but are preferably heating coils 706 or heating conduits 708. As with the other clamping arrangements, previously described, the heating system 700 is positioned around and in close proximity or in contact with the outer casing 712. Once in position, and prior to insertion of the inner casing or hanger 714, the outer casing 712 is heated using thermal energy provided via the heating elements 706 or the heating conduits 708. Any suitable method or mechanism may be used to provide the thermal energy. Typically, the heating elements 706 convert electrical power into thermal energy, thereby providing the heat needed. Any number of suitable fluids may be used to supply thermal energy via the heating conduits, for example, steam or a heated liquid may be passed through the conduits. As the thermal energy is passed from the system 700 into the outer casing, the outer casing expands. After sufficient expansion, the inner casing or hanger 714 may be passed through the outer casing 712 and properly positioned. Once the hanger is in place, the system is allowed to cool, either through simple dissipation of heat in the system or by passing a cooling medium through the system, such as through the conduits. As the outer casing cools, it shrinks toward it's original diameter. By selecting a hanger with an external diameter slightly larger the inner diameter of the outer casing at ambient temperature, a gripping or clamping force may be created by the outer casing on the hanger.

The clamping system herein described may be used in a relatively large number of applications, some of which may include additional material or mechanisms or may include alternate configurations of the clamping system. It should be understood that any number of combinations and uses may be found for the present invention.

Figure 12:
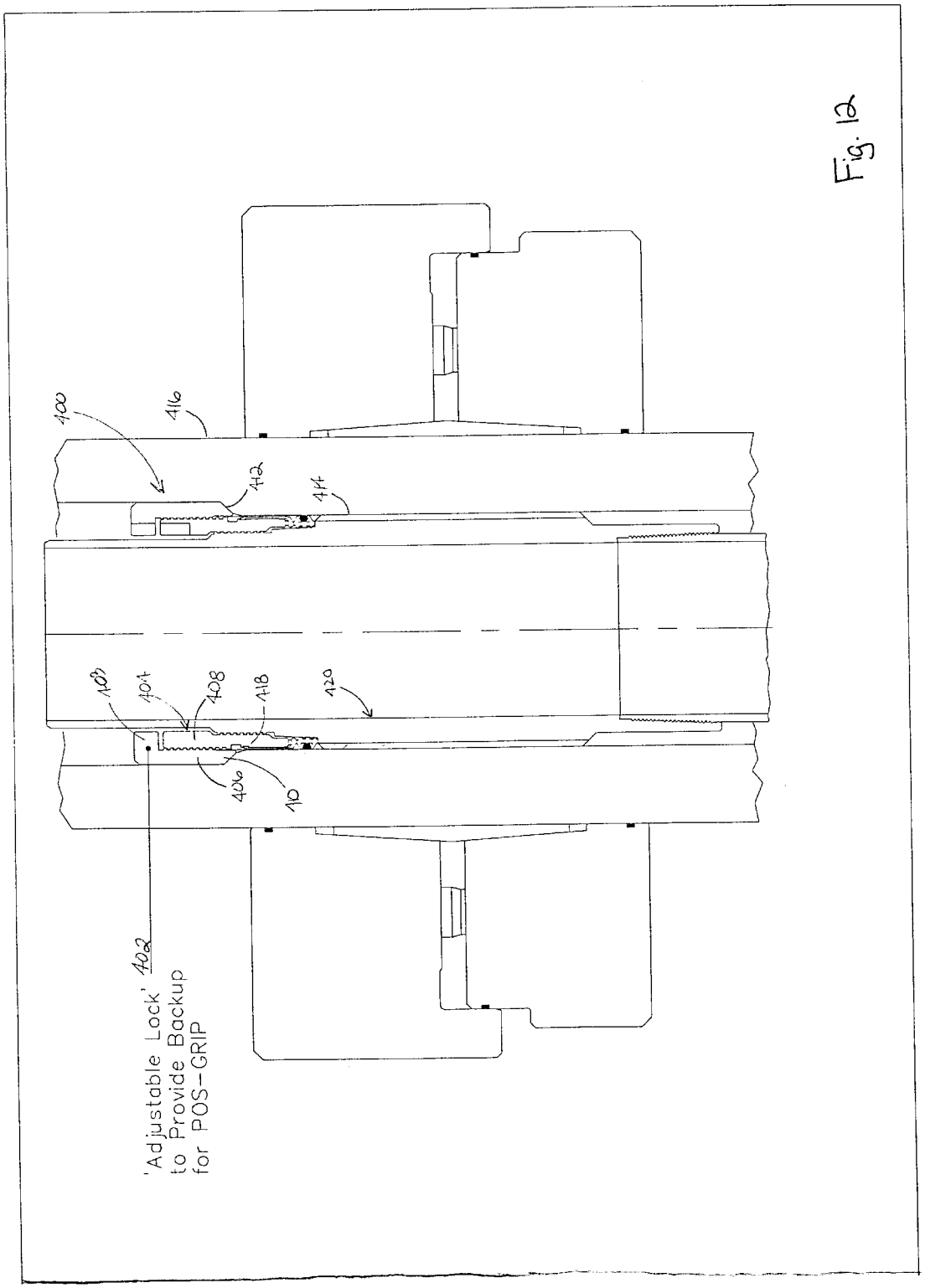
FIG. 12 shows a clamping arrangement having an adjustable locking mechanism.

For instance and as shown in FIG. 12, the clamping system previously described may further include a locking system to prevent substantial movement of the hanger in the event that the clamping system loses grip. Typically, such a locking system is provided as a safety device, although other uses are possible. The locking system 400 includes an outer member 402 capable of engaging an inner member 404. The outer member 402 has a lower threaded portion 406 for engaging a similarly threaded upper threaded portion 408 of the inner member 404. The outer member may also include an upper, running profile portion 403 for enabling the installation of the locking system 400 by the engagement of a running tool not shown. The lower portion 406 of the outer member preferably has a tapered shoulder 410 for engaging a similarly tapered shoulder 412 on the inner surface 414 of the outer casing or riser 416. The inner member has a threaded upper portion 408 for engaging the outer member and a threaded lower portion 418 for engaging a similarly threaded portion on the hangar 420. By including threaded portions on both the inner and outer members, as well as on the hanger, the locking system may be axially adjusted as needed. Typically, the outer member will be adjusted so that the shoulder 410 is in contact or immediately above the riser shoulder 412. Thus, if the gripping system should fail or otherwise loose grip, the two shoulder areas will engage to prevent axial downward movement of the hanger. Although the locking system is typically located above the gripping system, as shown in FIG. 12, it may be positioned in any suitable location.

Figure 13:
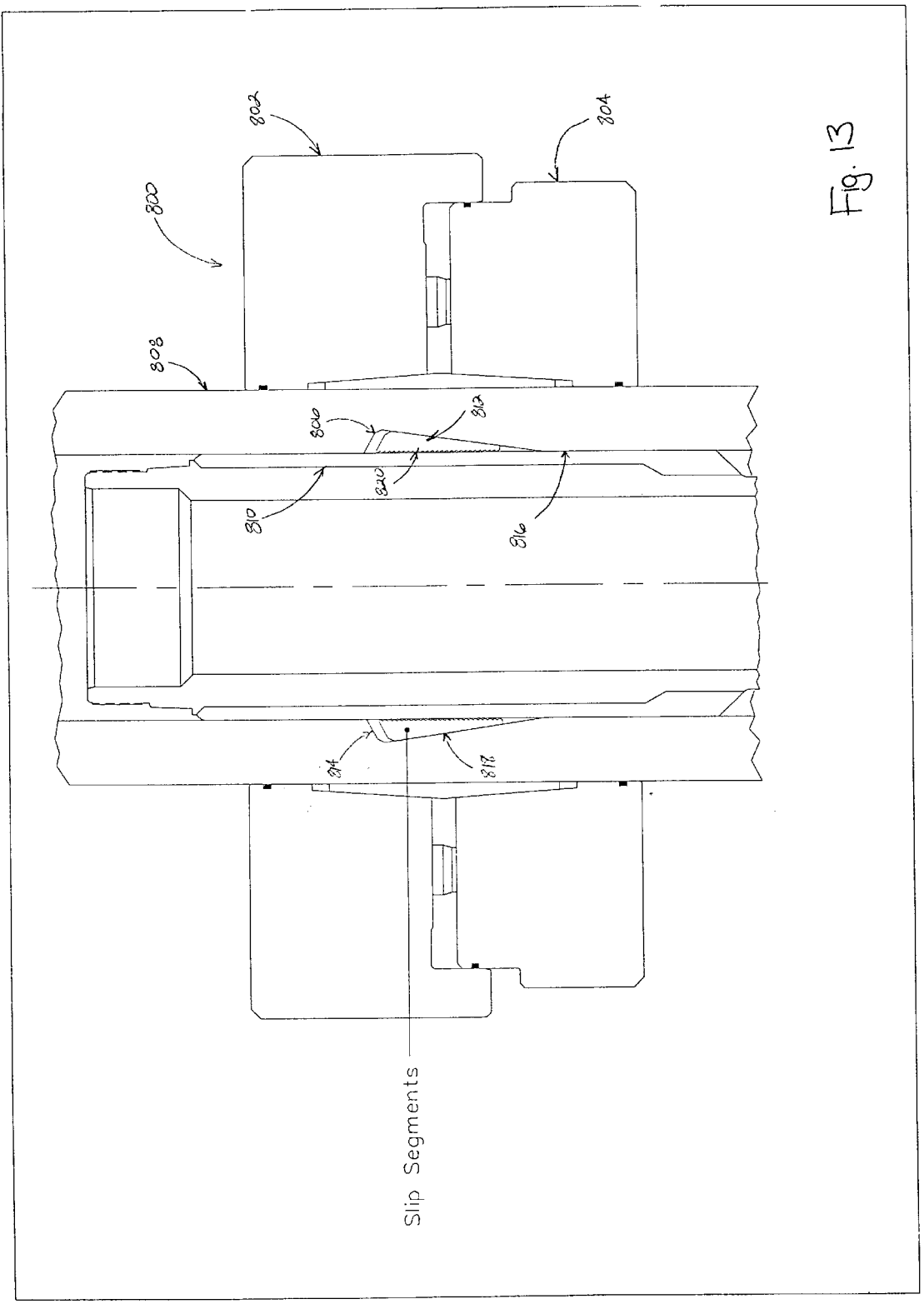
FIG. 13 shows a clamping arrangement which includes slip segments.

In yet another embodiment, slip segments may be used in conjunction with the clamping arrangement to provide additional safety or backup features. As shown in FIG. 13, the clamping system 800 includes an upper clamping ring or component 802 and a lower clamping ring or component 804 which are drawn together using a threaded bolt, for instance, or any other suitable method or mechanism, as has been previously described. A notch or groove 806 may be formed in the outer casing 810 or alternatively, in the hanger 810 (groove in hanger not shown), the groove having a angled or substantially triangular shape, such that a substantially shorter side 814 is angled outward from the inner surface 816 of the outer casing 808. A second substantially longer side 818 is angled downward and inward. An annular wedge or slip segment 812 may be disposed in the groove 806. The slip segment 812 is typically triangular or wedge shaped, corresponding generally to the shape of the groove, but being somewhat smaller overall. Due to the greater size of the groove 806, the slip segment 812 may slide axially in the groove between an initial or installed position and a safety or engaged position, as shown in FIG. 13. The slip segment is installed into the groove prior to moving the hanger into place. The slip segment is typically maintained in an upper, initial position by a shear pin or similar structure. Once the hanger is installed and clamped or gripping, the slip segment is maintained in the initial position until there is a loss of clamping force. Once the hanger 806 begins to move axially downward in relation to the outer casing 808, the shear pin will separate, leaving the slip segment free to move axially downward. Due to the inwardly sloped side 818 of the groove 806, the slip segment 812 is forced inward and into contact with the inner casing 810, forming a mechanical gripping force there between, which increases with greater axial movement of the inner casing 810 and slip segment 812. Preferably, the inner surface 820 of the slip segment is provided with notches or teeth to better grip the inner casing. Although described with particularity, it should be understood that the groove and slip segment may be of any suitable size and shape.

Figure 14:
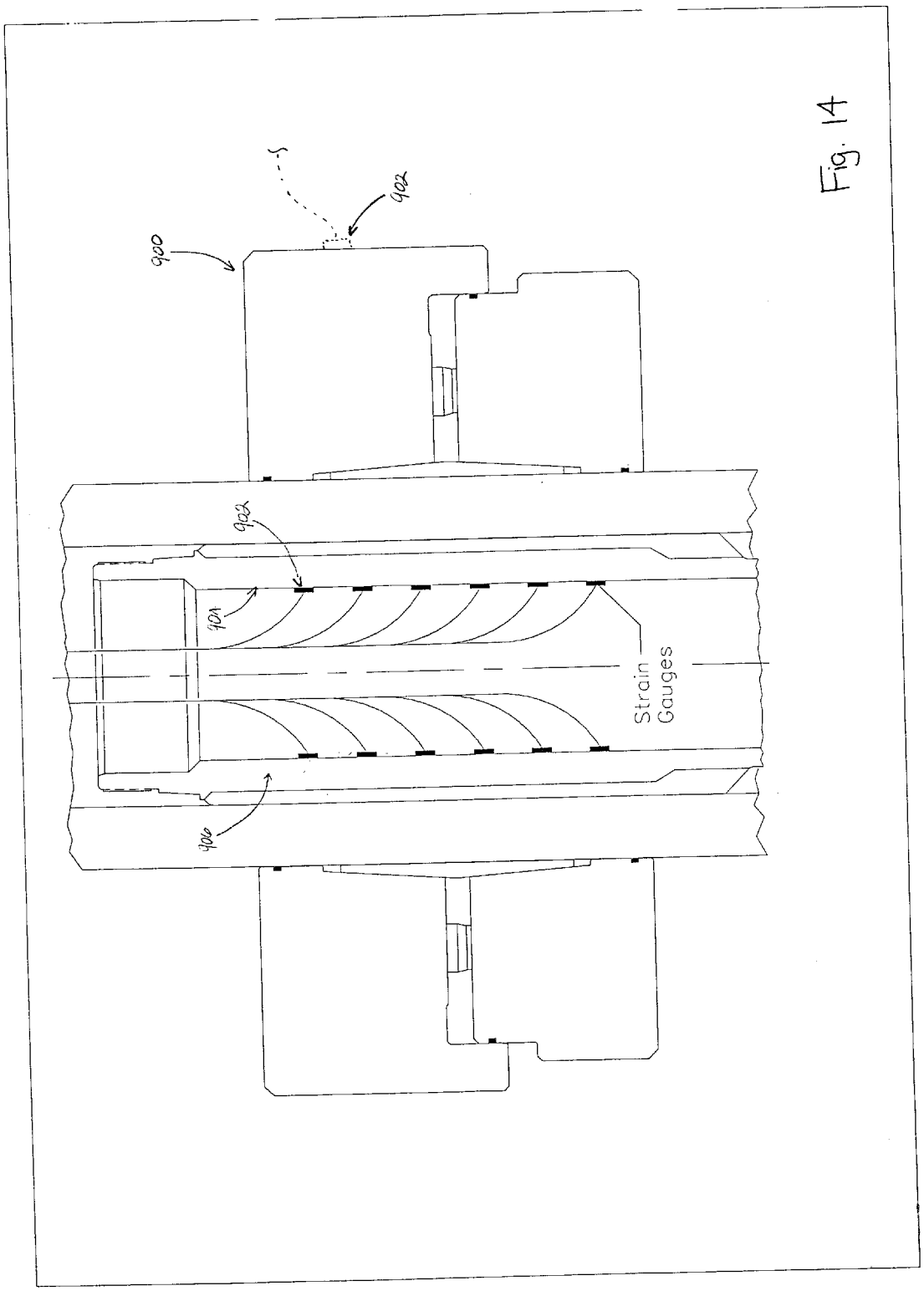
FIG. 14 shows a clamping arrangement which includes sensors.

It is useful in many cases where the clamping arrangement of the present invention is used to be able to monitor on a real time basis the amount of clamping force being provided. This is important initially to prevent the use of an excessive amount of force which may plastically deflect the outer casing, where such action is not desired, for instance. It is also useful in determining if the system is losing clamping force while in operation. As shown in FIG. 14, a plurality of strain gauges 902 may be used to monitor the clamping force exerted by the clamping arrangement 900 at any given time. Preferably, each strain gauge provides data to a monitoring system which then allows operators to determine the status of the system. Typically, the strain gauges are located on the inner surface 904 of the hanger 906. By placing gauges 902 at intervals along the length of the clamping area, operators can monitor not only the overall gripping force being exerted, but also the force being exerted at a particular location. In an alternate embodiment, one or a plurality of strain gauges may be located on the outside of the clamping arrangement. Regardless of the location, the gauges may prevent inadvertent or unknowing failure of the clamping arrangement by detecting decreases in gripping strength prior to loss of grip between the outer casing and the hanger.

Figure 15:
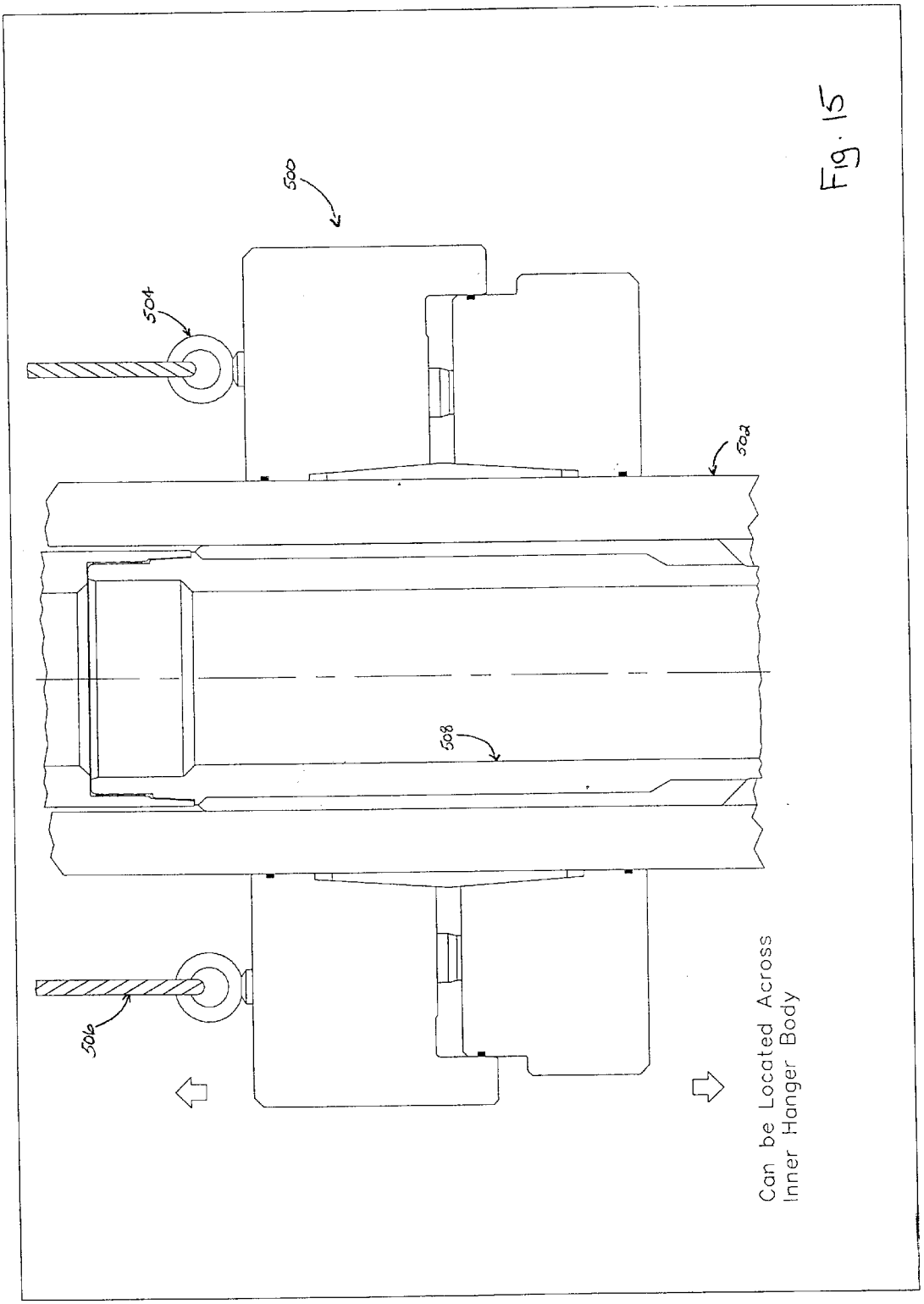
FIG. 15 shows a moveable clamping arrangement.

A significant problem in some wells, especially deeper wells, is the inability of operators to predict the exact location of the hanger after the casing has been run. Due to production tolerances and the relatively large number of joints required for deep wells, space out becomes a problem. The present invention may be modified to alleviate this problem. As shown in FIG. 15, the clamping arrangement 500 may be mounted in such a way to allow it to move or slide along the length of the outer casing 502. Any suitable mechanism may be employed to allow movement, in one embodiment, a plurality of hooks or loops 504 may be attached to the clamping arrangement so that it can be raised and lowered using rope, chain or cable 506. By allowing the clamping arrangement to move axially, the inner casing is more easily spaced out because precise location of the hanger 508 is not required. Clamping force may be provided as previously described and is not affected by movement of the arrangement.

Figure 16:
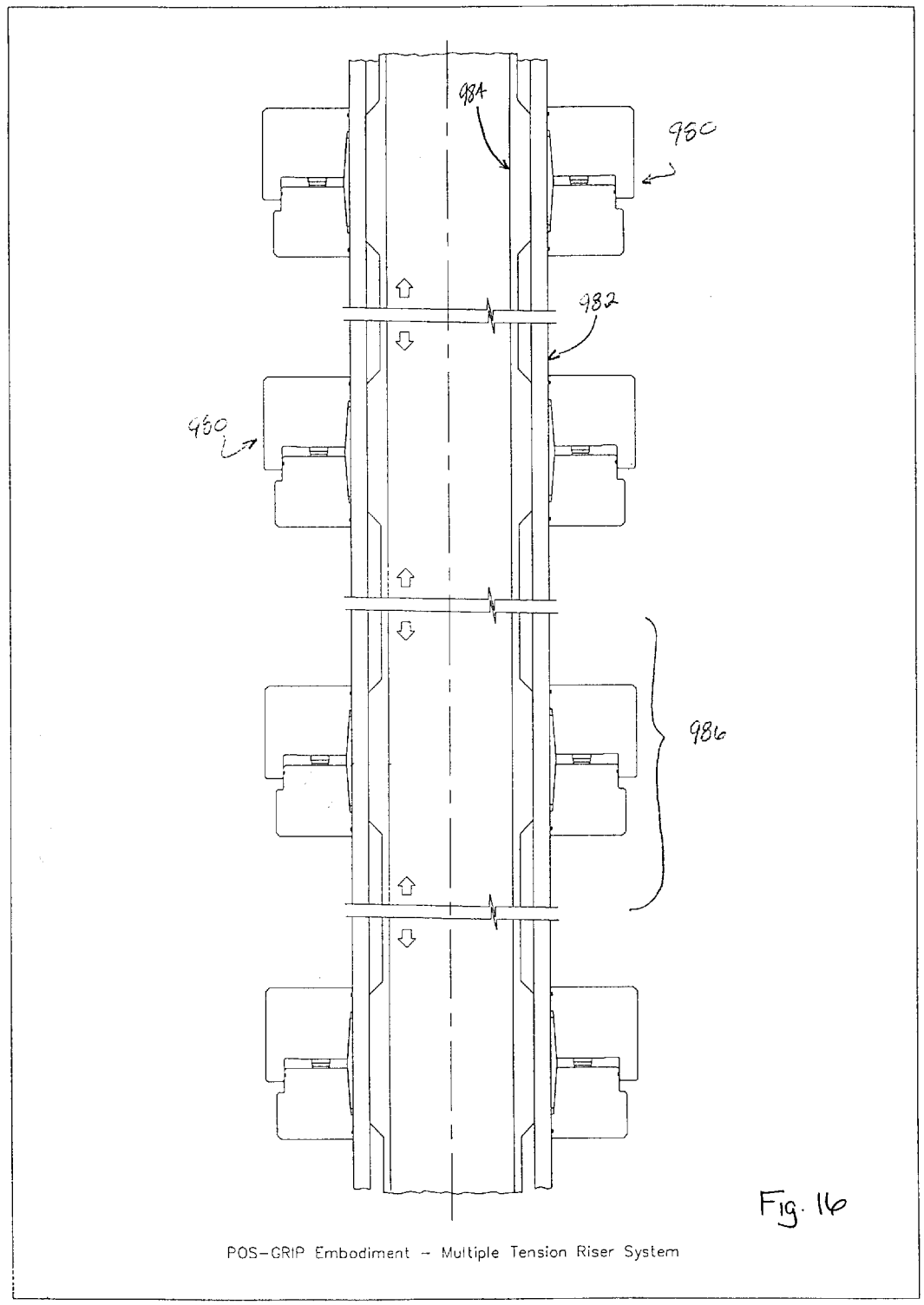
FIG. 16 shows a clamping system for adjustment of tension and/or compression in a string.

Yet another problem, especially in deep water wells, is that either tension or compression may build up along the concentric strings, thereby causing problems in the capacity of a system limiting its capability in respect of the length of the concentric risers. The present invention may be used to alleviate such problems. Similarly, it may be desirable in certain instances to create tension or compression between inner and outer strings or a part thereof. As shown in FIG. 16, a plurality of clamping arrangements 980 may be employed to accomplish these goals. The clamping arrangements 980 may be arranged or positioned at intervals along the length of the string. The area or segment 986 between each clamping arrangement may then be separately controlled and changed for the specific needs of the particular string by clamping or gripping the casing at a predetermined location. The tension or compression in a particular segment 986 can this way be incrementally controlled. Typically at least some number of clamping arrangements will be located subsurface, however, the arrangements may be located in any suitable position. Typically, a clamping arrangement 980 is positioned around the riser or outer casing 982, as previously described. The inner casing 984 may be of any suitable type for use in the present invention, but is preferably a special segment having thickened walls, such as found in hangers.

Figure 17:
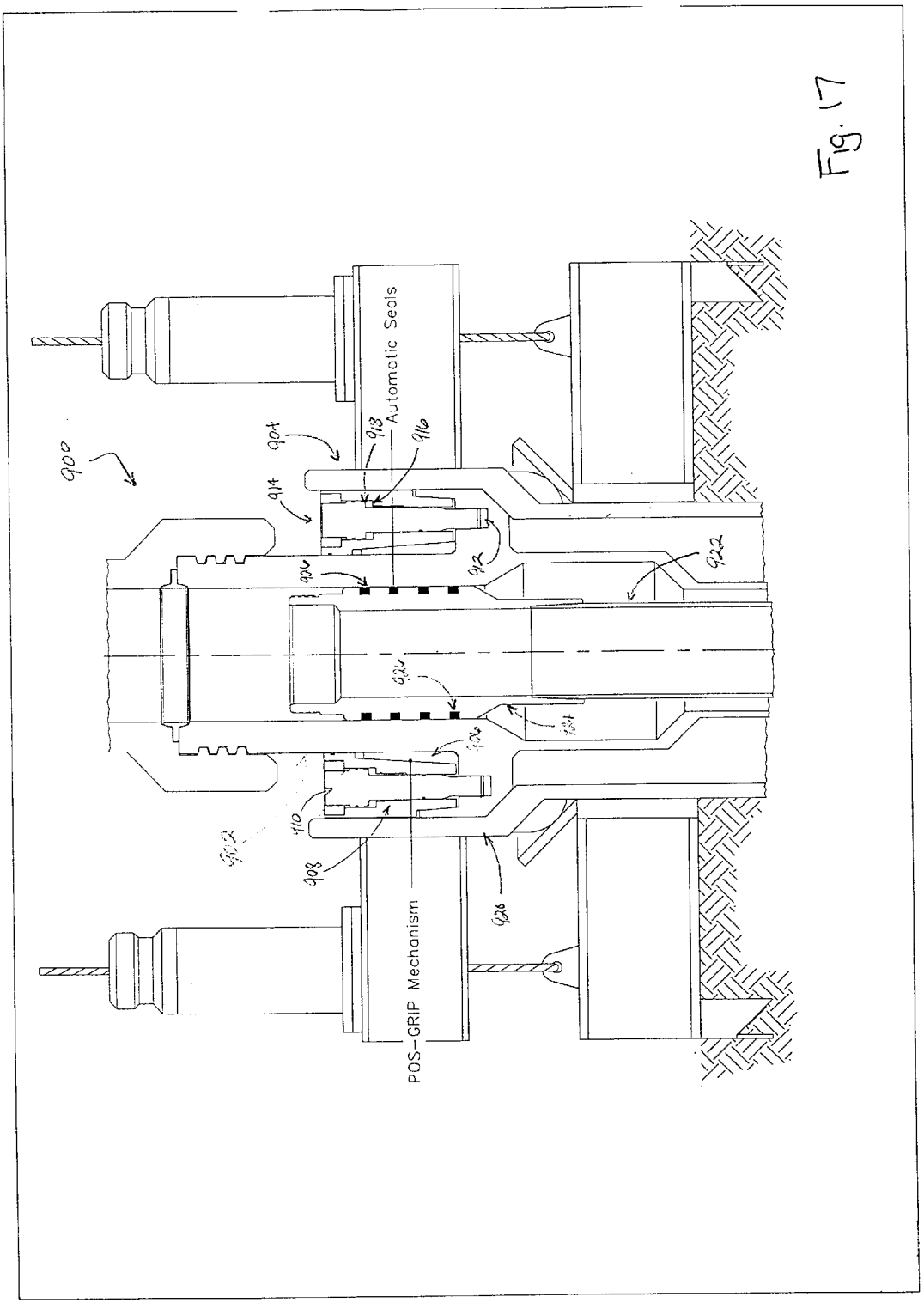
FIG. 17 shows a clamping arrangement for use at a subsea wellhead.

A common problem encountered in completing a subsea wellhead is the inability to properly control the tension in the casing after the subsea casing hanger has been landed on its shoulder in the Subsea wellhead. Currently, the casing tension is provided only by the residual load between the Subsea casing hanger and its running tool just prior to landing in the subsea wellhead. This method is relatively imprecise because the casing weight can be significantly or sometimes totally dissipated by differential sticking of the casing string in the hole. By incorporating a clamping arrangement of the present invention into the subset wellhead, a precise amount of tension may be added to the casing. As shown in FIG. 17, the present invention may be modified for use in a subset wellhead 900. Typically, an outer casing or wellhead 902 is anchored to the sea floor. Preferably, the clamping arrangement 904 is incorporated into the outer casing or wellhead 902 itself, as shown in FIG. 17, however, it may be a separate assembly, as previously described. An externally tapered annular sleeve 906 is located around the outer casing or wellhead 902. An annular component 908 having a plurality of bores or holes 914 there through is positioned substantially around and outside the sleeve 906. Each bore has a shoulder 916 formed therein, for the purpose creating a piston area between seal sets 928, which is used to hydraulically tension the system and ultimately retaining a fastener. The annular component 908 has a corresponding externally tapered surface for engaging the sleeve 906. The outer casing or wellhead is preferably adapted for receiving threaded bolts, screws or other suitable fasteners 910 into correspondingly threaded bores 912 formed therein. The bolts preferably have a flange 918 capable of engaging the shoulder 916 of the holes 914. The hole 914 corresponds generally to the threaded bore 912 such that the bolt 910 may pass through the holes 914 and engage the bore 912. As the bolt 910 engages the threaded bore 912, an annular pocket area is created between the flange 918 and shoulder 916. When hydraulic fluid is introduced in the annular pocket area under sufficient pressure, the effect is that the annular component 908 is pushed downward. This downward movement causes the corresponding tapered surfaces of the annular component and the sleeve to engage and create a clamping force which is directed inwardly and which will deflect the outer casing or wellhead bore inwardly as well. Simultaneously to deflecting the outer casing or wellhead bore inwards the lower section 930 of the annular component 908 flares a lower rim 932 on outer casing or wellhead 902 outwards so as to friction lock the outer casing or wellhead 902 into the conductor receptacle 920. As the inner casing 922 and hanger 924 are moved into location, prior to any clamping force being exerted, the casing 922 is typically cemented or otherwise affixed in the well bore. It is often desirable to have a certain degree of tension in the inner casing after it has been cemented. Using the prior art methods of shoulders or slips, is impossible to achieve in subsea wellhead applications. The present invention, however, allows the inner casing 922 to be positioned below it's final position, in a wider section of the outer casing or wellhead 902, where the fluid returns generated, while the inner casing 922 is cemented in, can flow past the casing hanger 924. Once the cement has set the casing 922 can be stretched upwards into position using the casing running string. This creates tension in the casing 922. By pulling the casing 922 up a predetermined distance, or by using suitable measuring equipment, tension in the casing 922 may be set relatively precisely. Once the casing 922 and hanger 924 are pulled into position, hydraulic pressure is remotely introduced in the annular pockets between the seal sets 928, thereby generating a clamping force between the bore of the outer casing 902 and the outer surface of the casing hanger 924, for maintaining the position of the hanger 924 and casing 922. A secondary effect of the gripping action of the outer casing or wellhead bore on the casing hanger is to compress a number of annular seals 926, so as to seal the casing hanger outer diameter against the inner bore of the outer casing or wellhead 902.

Figure 18:
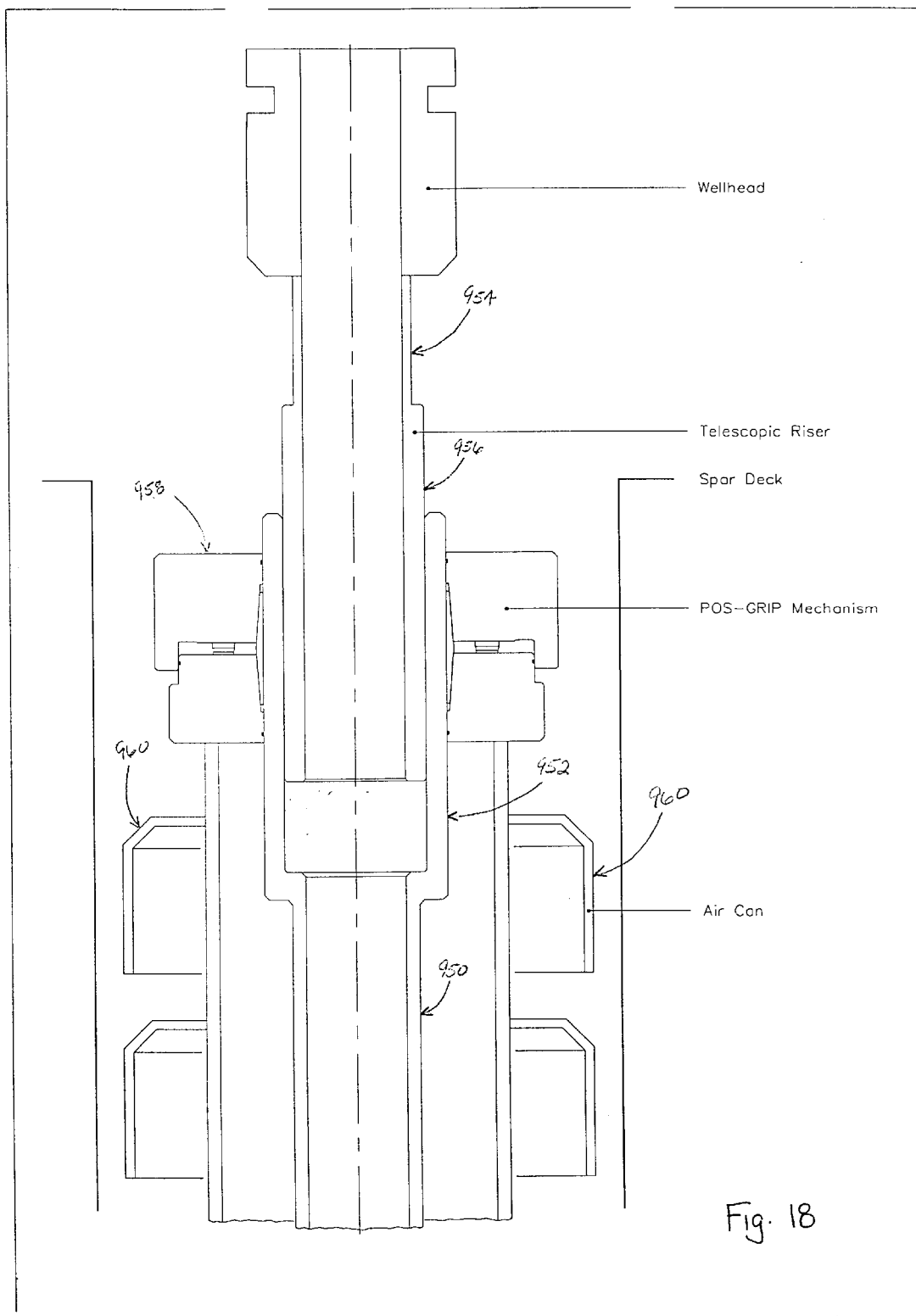
FIG. 18 shows a riser spaceout system which employs the clamping system of the present invention.

As with the inner casing, it is often difficult to predict the precise terminating location of the outer riser at the surface, especially in deep water wells. Due to production tolerances in the joints and the fact that the riser it typically landed on a fixed shoulder at the subset wellhead, shakeout of the outer riser typically involves having to cut the riser to the desired length once it has been completely installed. This procedure is time consuming and expensive. FIG. 18 shows a first riser segment 950 which incorporates a receiving area 952 having an increased inner diameter. A second riser segment 954 has a lower end 956 which has an outer diameter slightly smaller than the inner diameter of the receiving area 952 of the first riser segment 950. Additionally a larger diameter pipe section 962 is shown onto which inverted air cans 960 are affixed. The air cans are used to impart upward tension to the first riser segment 954, to counter act the weight of the riser segment which reaches all the way to the ocean floor. The, so called, tensioner riser 960 and 962 is at its upper end permanently affixed to a clamping arrangement 958. The relative positions, with respect of the deck 968, of the tensioner riser clamping arrangement 958, as indicated by X 964 and of the top of the terminating wellhead 970, as indicated by Y 966, are important to the eventual layout of the production facility. The present invention may be used to more quickly and easily space out the clamping assembly 958 and the wellhead 970. Following installation and temporary suspension of the tensioner riser 962 and 960 from the deck 968, the first riser segment 950 is installed through the temporary suspended clamp assembly 958. The receiving area 952 is configured of sufficient length to insure that at least a section of the receiving area 952, of equivalent length to the claiming assembly 958 is located in the clamping assembly, this notwithstanding the fact that production tolerances will cause the first riser section 950 to be of uncertain length. Subsequently, the lower end 956 of the second riser segment 954 may be positioned into the receiving area 952 of the first riser segment 950. Depending on the length of the lower end, a relatively large degree of adjustability may be achieved. Once the lower end 956 and the receiving end 952 are properly aligned, the clamping arrangement 958 disposed around the receiving area 952 may be used to provide a clamping force against the receiving end, thereby attaching the tensioned riser 960 and 962 to the outer diameter of the first riser segment 950 and clamping the lower end 956 of the second riser segment 954 in the receiving end 952. The lower end 956 of the second riser segment 954 may have thickened walls to provide extra strength and to enable application of sufficient friction force.

Figure 19:
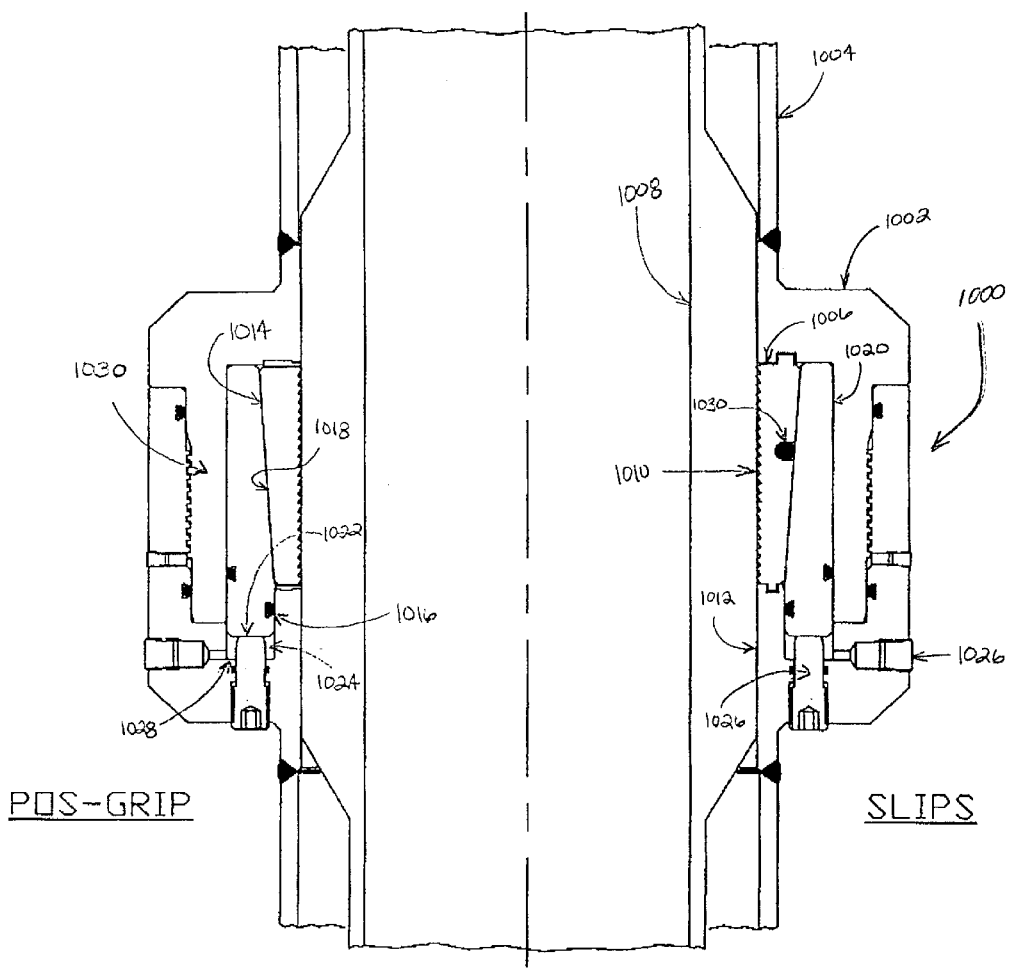
FIG. 19 shows an eighth embodiment of the clamping arrangement.

Although the previous embodiments of the present invention show a clamping arrangement positioned externally of an outer pipe or tubular member, it should be understood that the clamping arrangement may be located in any suitable position for clamping or gripping the inner pipe. For instance, and as shown in FIG. 19, the clamping arrangement 1000 may comprise a housing 1002 which may be integrated into an outer pipe or casing 1004. An inner annular, tapered clamping segment or ring 1006 is positioned in contact with an inner casing hanger 1008 or similar structure which must be clamped or gripped. The clamping ring preferably has an inner surface 1010 which is substantially parallel to the outer surface 1012 of the hanger 1008 and a tapered outer surface 1014. An outer annular tapered clamping segment or ring 1016 is positioned radially outwardly of the first ring 1006 and has a tapered inner surface 1018 which corresponds to and is in contact with the tapered outer surface of the first ring 1014 and an outer surface 1020 which is preferably substantially parallel to the hanger 1008. The housing 1002 is formed such that the lower or bottom surface 1022 forms the upper surface or roof of a pressure chamber 1024. The pressure chamber includes a port 1026 for introducing a hydraulic fluid into the chamber 1024. Preferably, the chamber also includes a bolt or screw 1026 extending through the floor 1028 of the chamber 1024. As fluid is introduced into the chamber 1024, the outer tapered ring 1016 is pushed axially upward. As the outer ring 1016 moves, the corresponding tapered inner surface 1018 and tapered outer surface 1014 cause an inward deflection of the inner ring 1006 thereby causing a gripping or clamping force to be exerted by the inner ring 1006 against the hanger 1008. A retaining structure or ring 1030, which is preferably prevents outward movement of the outer ring 1016. Once the outer ring 1016 has been moved far enough to create a sufficient clamping force, the bolt 1026 may be threaded through the floor 1028 of the chamber 1024 and positioned against the bottom surface 1022 of the outer ring 1016, thereby creating a mechanical stop or lock to prevent downward axial movement of the outer ring, even if pressure in the chamber is lost or decreased. The inner ring 1008 may be formed from a plurality of independent sections or may be a single, continuous ring. Where the inner ring 1008 is formed of sections, a band or O-ring 1030 may located around the outer surface 1014 of each sections to aid in retaining the sections in place during use.

What is claimed is:

1. A clamp assembly for securing a rigid, generally cylindrical outer casing to a rigid, generally cylindrical inner casing member, the clamp assembly comprising:

an annular compression member radially surrounding the outer casing, the annular compression member having a pair of opposed, outwardly-facing ramp surfaces;

a pair of collars radially surrounding the compression member, each of the collars having an inwardly-facing ramp surface for contacting and adjoining one ramp surface of the compression member;

a means for axially moving the pair of collars with respect to one another to cause the annular compression member to be deformed radially inwardly to cause the outer casing to grip the inner casing member in a primary clamping grip; and a locking system to prevent substantial movement of the inner casing member with respect to the outer casing in the event that the primary clamping grip fails.

2. The clamp assembly of claim 1 wherein the locking system comprises:

an outwardly and downwardly facing first tapered shoulder associated with the inner casing member; and a complementary inwardly and upwardly facing second tapered shoulder associated with the outer casing, the first and second shoulders engaging one another upon failure of the primary clamping grip.

3. The clamp assembly of claim 2 wherein the first tapered shoulder is formed upon an annular member that is affixed by at least one threaded connection to the inner casing member.

4. The clamp assembly of claim 2 wherein the second tapered shoulder is formed within an inner surface of the outer casing.

5. The clamp assembly of claim 1 wherein the locking system comprises:

a slip member disposed between the inner casing member and outer casing, said slip member shaped and sized to cause a mechanical gripping between the inner casing member and outer casing in the event the primary clamping grip fails.

6. The clamp assembly of claim 5 herein the slip member is an annular member.

7. The clamp assembly of claim 5 wherein the slip member is a segment of an annular member.

8. The clamp assembly of claim 5 wherein the slip member presents a notched inner surface for gripping the inner casing member.

9. The clamp assembly of claim 5 wherein the slip member presents a downwardly-tapered outer surface for engagement of a complementary surface on the outer casing.

10. A riser system comprising:

an inner, generally cylindrical casing;

an outer, generally cylindrical casing that radially surrounds the inner casing member;

a plurality of clamping arrangements secured to the outer casing, each of said clamping arrangement being selectively moveable between a first position wherein the clamping arrangement does not secure the outer casing to the inner casing member and a second position wherein the clamping arrangement radially compress a portion of the outer casing radially inwardly, each of the clamping arrangements comprising:
  an annular compression member radially surrounding the outer casing, the annular compression member having a pair of opposed, outwardly-facing ramp surfaces;
  a pair of collars radially surrounding the compression member each of the collars having an inwardly-facing ramp surface for contacting an adjoining one ramp surface of the compression member; and
  a means for axially moving the par of collars with respect to one another to cause the annular compression member to be moved radially inwardly to cause the outer casing to be compressed radially inwardly.

11. The riser system of claim 10 wherein the clamping arrangements are located at intervals along the outer casing.

12. A subsea wellhead assembly for a subsea wellhead, comprising:
  a conductor receptacle;
  an outer, generally cylindrical casing retained within the conductor receptacle;
  an inner, generally cylindrical casing member radially disposed within the outer casing; and
  a locking component disposed between the outer casing and the conductor receptacle, the locking component being moveable between a first position wherein the outer casing is not radially compressed by the locking component and a second position wherein the locking component radially compresses the outer casing inwardly to grip the inner casing member, the locking component comprising an annular sleeve having a threaded bore therewithin.

13. The subsea wellhead of claim 12 wherein the locking component further comprises a fluid pocket formed within the threaded bore.

14. An adjustable, telescopic riser connection comprising:
  a first, generally cylindrical riser member having a radially enlarged receptacle at an end;
  a second, generally cylindrical riser member having an end that is shaped and sized to be retained within the receptacle, thereby creating a riser string;
  a clamping arrangement disposed radially around the receptacle, said clamping arrangement being selectively moveable between a first position wherein the clamping arrangement does not secure the first riser member to the second riser member and a second position wherein the clamping arrangement radially compresses a portion of the receptacle radially inwardly to secure the end of the second casing within the receptacle, thus providing for adjustability in the length of the riser string.

15. The riser system of claim 14 wherein at least one air can is secured to a riser member.

16. A clamp assembly comprising:
  an inner, generally cylindrical casing member;
  an outer, generally cylindrical casing member that radially surrounds the inner casing member, the outer casing member having a radially outer surface and a radially inner surface;
  a clamping arrangement secured to the outer casing member, said clamping arrangement being selectively moveable between a first position wherein the clamping arrangement does not secure the outer casing member to the inner casing member and a second position wherein the clamping arrangement radially compresses a portion of the outer casing member radially inwardly; and
  the outer casing member having at least one generally vertically-oriented slot formed along its length to help alleviate hoop stresses during compression of the outer casing member.

17. The clamp assembly of claim 16 wherein the vertically-oriented slot is formed within the outer radial surface of the outer casing member.

18. The clamp assembly of claim 16 wherein the vertically-oriented slot is formed within the inner radial surface of the outer casing member.

19. The clamp assembly of claim 16 wherein there are a plurality of said slots, the slots being disposed in a generally parallel relation to one another and being positioned at an interval about the circumference of the outer casing member.

20. The clamp assembly of claim 19 herein the interval is approximately 7.5 degrees.

* * * * *